(12) United States Patent
Wei

(10) Patent No.: US 12,096,050 B1
(45) Date of Patent: Sep. 17, 2024

(54) SYSTEM, APPARATUS, AND METHOD FOR IMPROVING TRANSMISSION RESOURCE ALLOCATION IN TRANSPORTING VIDEO CONTENT

(71) Applicant: Mingze Wei, San Ramon,, CA (US)

(72) Inventor: Mingze Wei, San Ramon,, CA (US)

( * ) Notice: Subject to any disclaimer, the term of this patent is extended or adjusted under 35 U.S.C. 154(b) by 0 days.

(21) Appl. No.: 18/600,059

(22) Filed: Mar. 8, 2024

(51) Int. Cl.
- *H04N 21/238* (2011.01)
- *H04N 21/24* (2011.01)
- *H04N 21/262* (2011.01)
- *H04N 21/6332* (2011.01)

(52) U.S. Cl.
CPC ....... *H04N 21/238* (2013.01); *H04N 21/2402* (2013.01); *H04N 21/26216* (2013.01); *H04N 21/6332* (2013.01)

(58) Field of Classification Search
CPC ............. H04N 21/238; H04N 21/2402; H04N 21/26216; H04N 21/6332
See application file for complete search history.

(56) References Cited

U.S. PATENT DOCUMENTS

| | | | |
|---|---|---|---|
| 6,289,217 | B1 | 9/2001 | Hamalainen et al. |
| 6,574,211 | B2 | 6/2003 | Padovani et al. |
| 7,929,546 | B2 | 4/2011 | Joshi et al. |
| 8,934,345 | B2 | 1/2015 | Tan et al. |
| 8,982,846 | B2 | 3/2015 | Baker et al. |
| 9,967,900 | B2 | 5/2018 | He et al. |
| 10,362,601 | B2 | 7/2019 | Itagaki et al. |
| 10,542,526 | B2 | 1/2020 | Seek |
| 10,880,895 | B2 | 12/2020 | Gordaychik |

(Continued)

FOREIGN PATENT DOCUMENTS

| | | | | |
|---|---|---|---|---|
| JP | 2009060249 A | * | 3/2009 | ....... H04L 12/40013 |
| WO | 2018045302 A1 | | 3/2018 | |
| WO | WO-2024032011 A1 | * | 2/2024 | ............. H04L 67/61 |

OTHER PUBLICATIONS

Kao, Enoch Chia-chi. "A dynamic random channel reservation for MAC protocols in multimedia wireless networks." (2001).

*Primary Examiner* — Jeffery F Harold
*Assistant Examiner* — Alexander Boyd
(74) *Attorney, Agent, or Firm* — Leason Ellis LLP

(57) ABSTRACT

A system, apparatus, and method for improving resource allocation in transporting video content that includes enabling link quality measurement for communication links to corresponding video display nodes; initializing resource interval link quality measurement fields; transmitting link quality measurement and multi-channel cross-slot allocation signaling; receiving link quality measurements for the respective communication links; selecting at least one multi-channel cross-slot allocation strategy for each of the video display nodes based on the received link quality measurements; signaling the selected at least one multi-channel cross-slot allocation strategy to the video display nodes using the resource interval link quality measurement fields; transmitting video data using a modified video data transmission frame structure communication protocol and based on the selected at least one multi-channel cross-slot allocation strategy; and upon receiving confirmation of correct reception of the video data from the video display nodes, cancelling the modified video data transmission frame structure communication protocol.

17 Claims, 22 Drawing Sheets

(56) References Cited

U.S. PATENT DOCUMENTS

| | | |
|---|---|---|
| 11,343,464 B2 | 5/2022 | Sugano et al. |
| 2017/0064718 A1* | 3/2017 | Bharadwaj ........... H04B 7/0452 |
| 2023/0070642 A1 | 3/2023 | Ma et al. |
| 2023/0277261 A1* | 9/2023 | Roh ....................... G16H 20/40 |
| | | 700/2 |
| 2023/0354329 A1 | 11/2023 | Lee et al. |

* cited by examiner

304

600

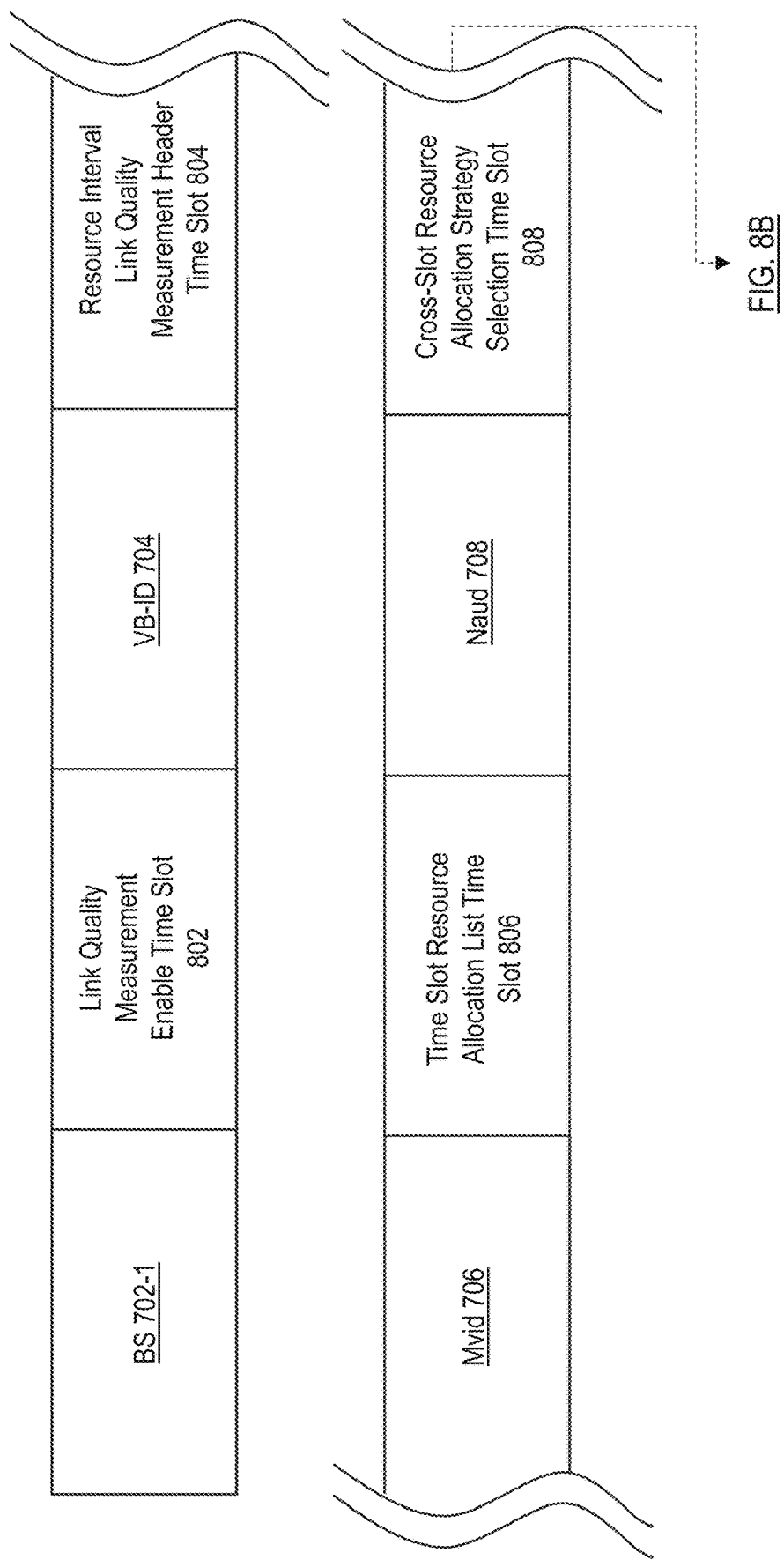

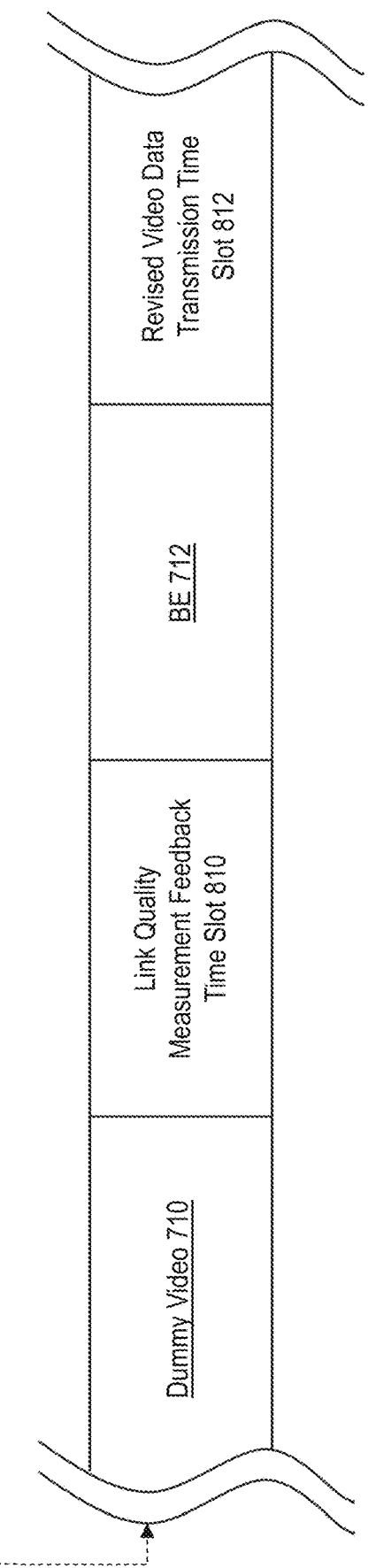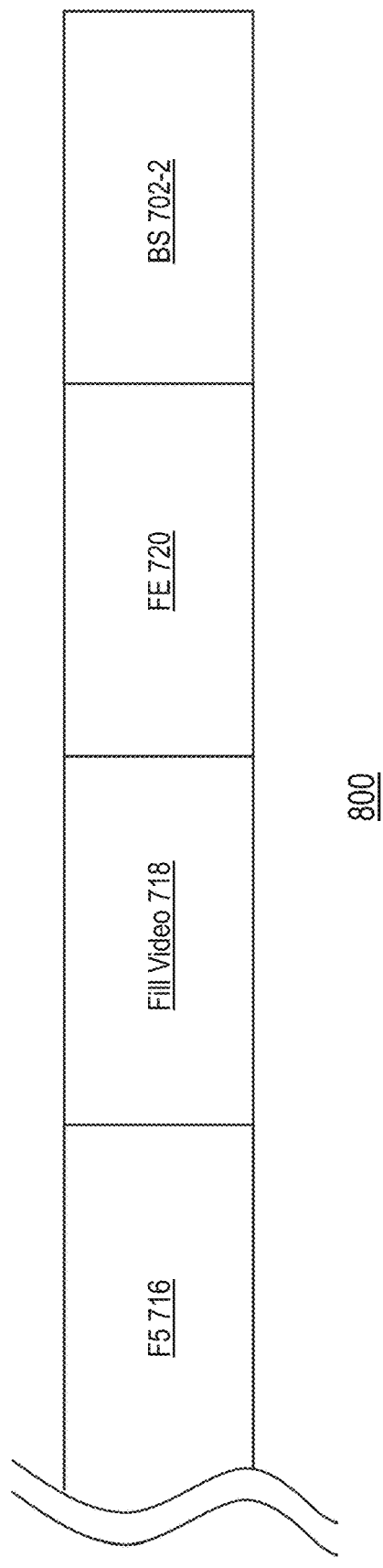
FIG. 8A
FIG. 8B

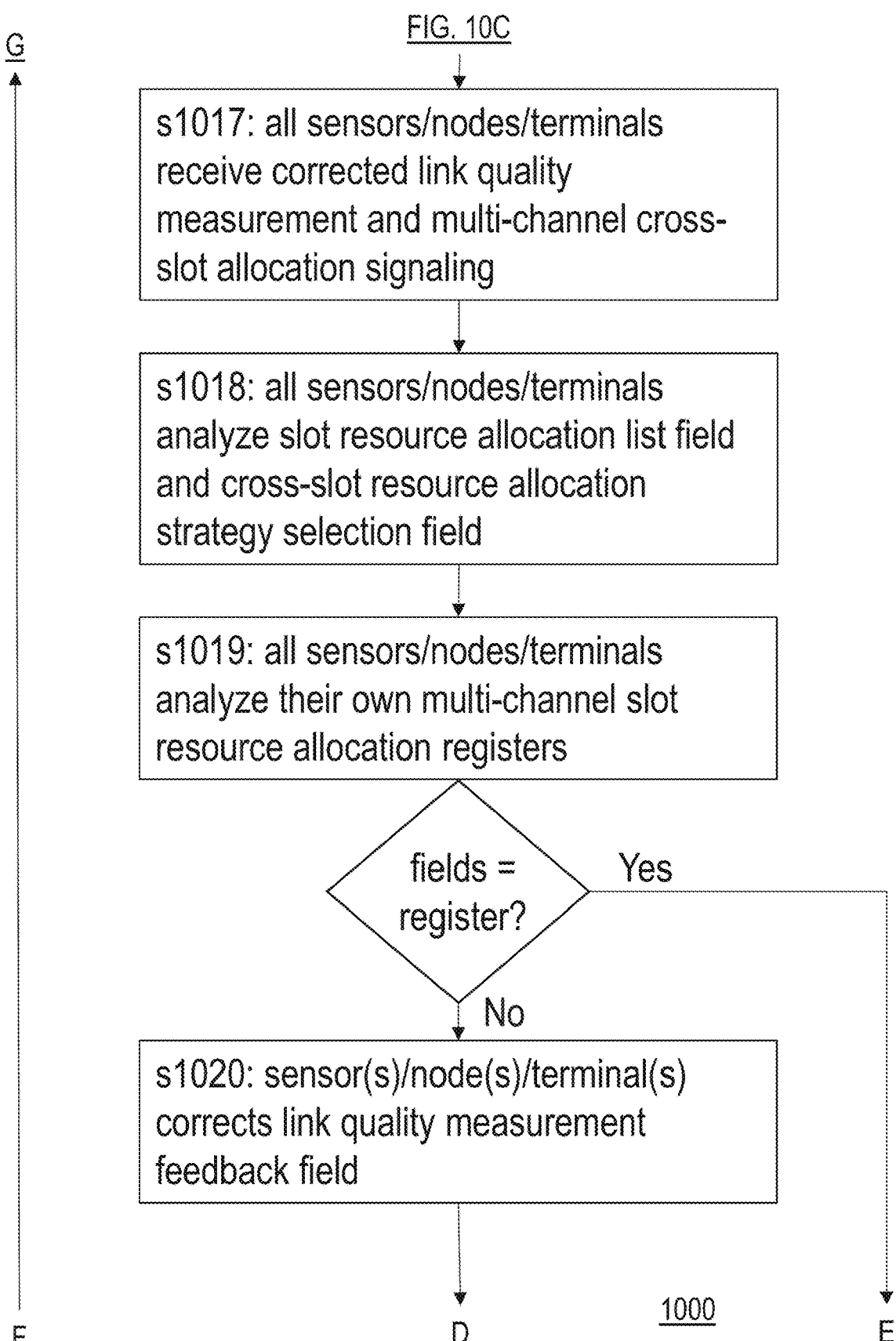

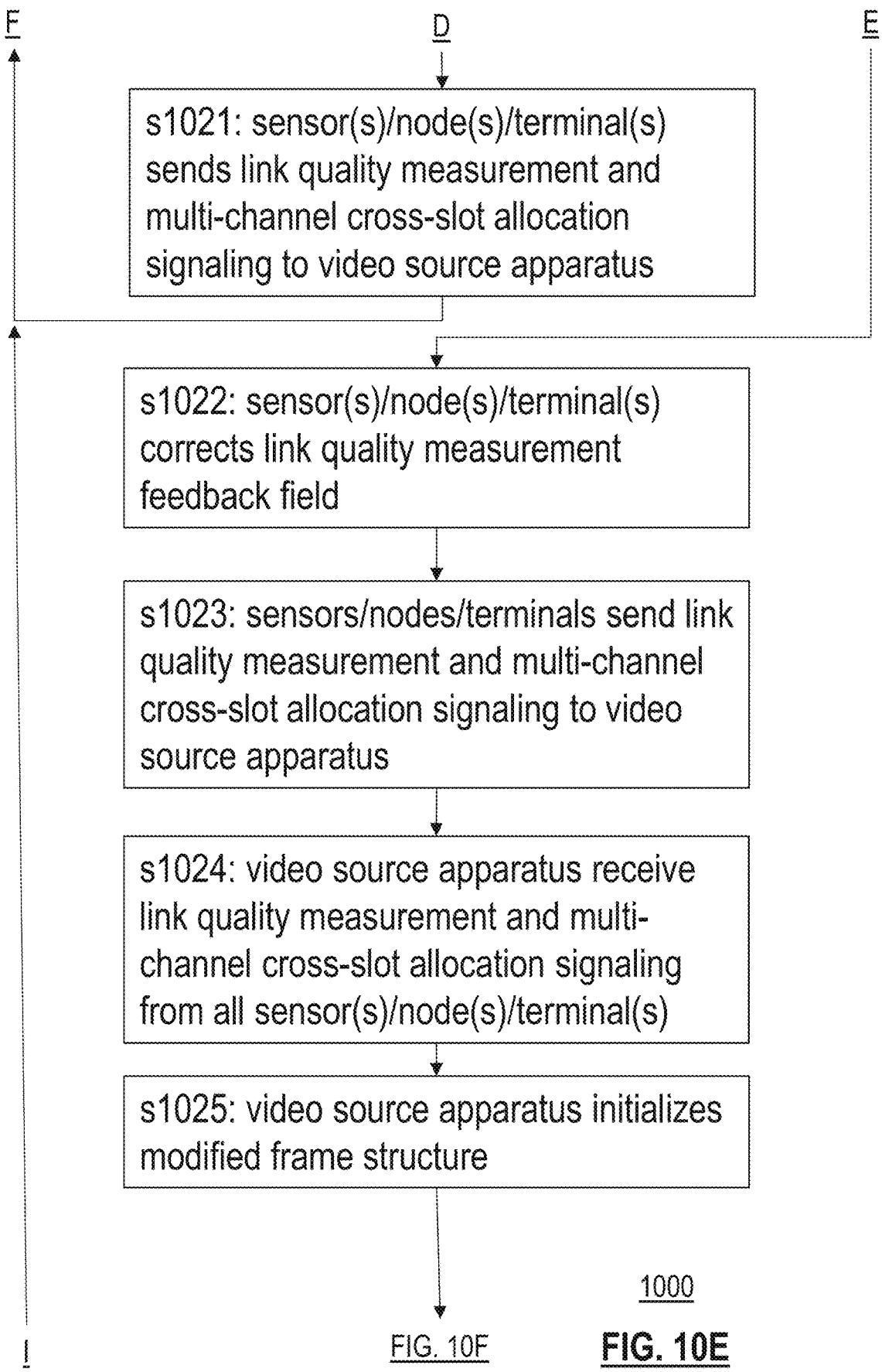

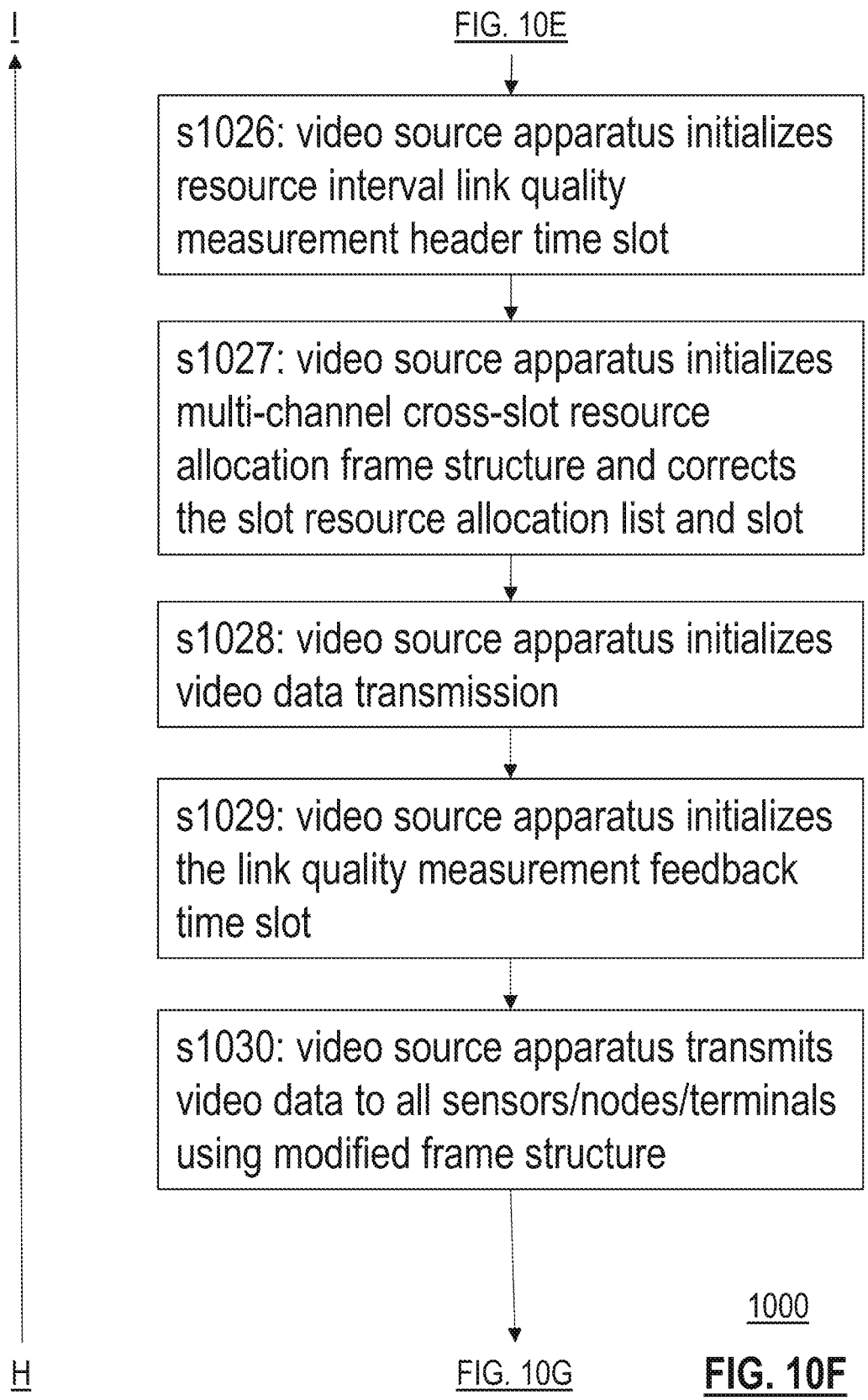

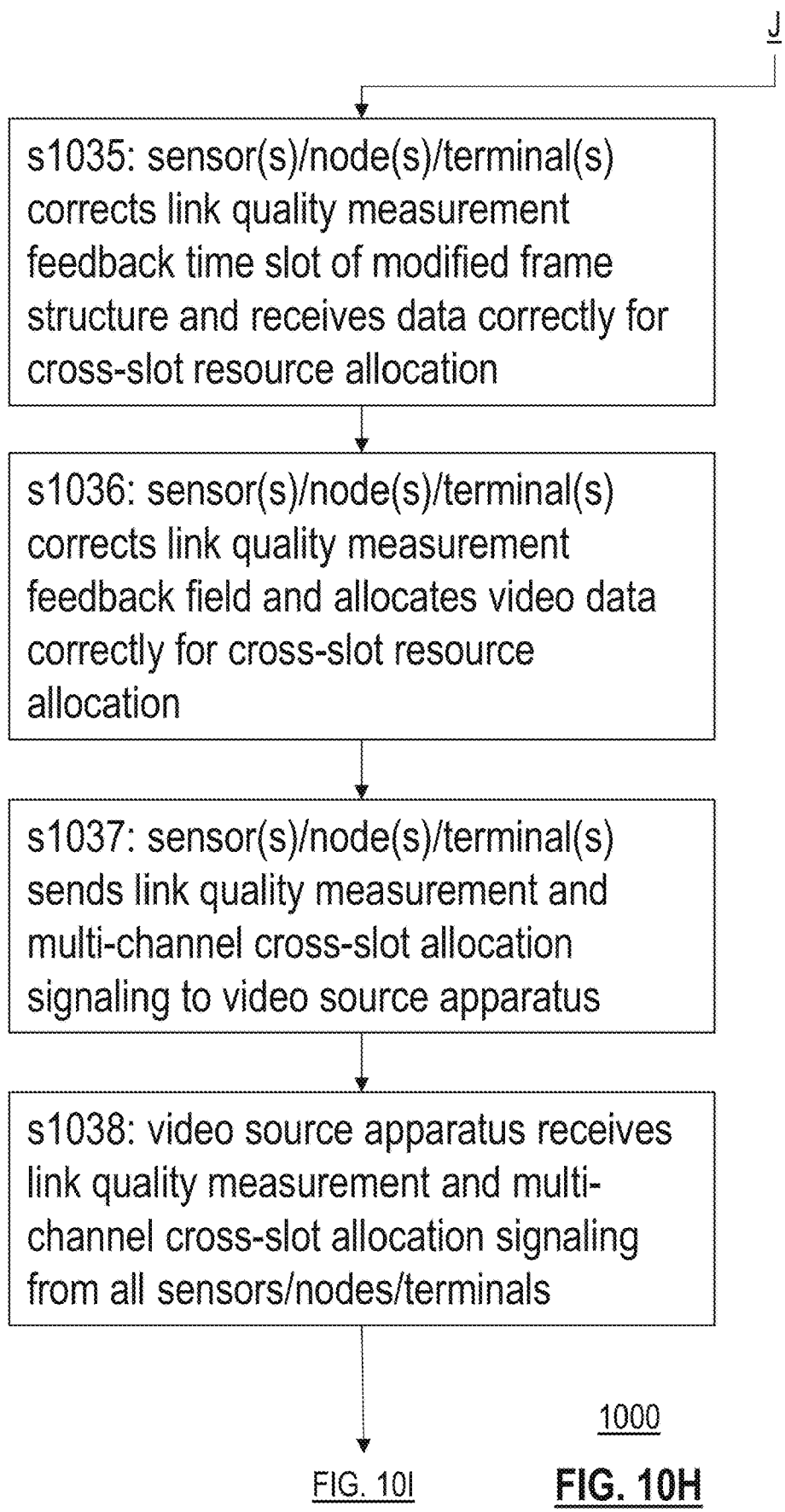

FIG. 10H

↓ s1039: video source apparatus cancels link quality measurement

↓ s1040: video source apparatus cancels resource interval link quality measurement header time slot of modified frame structure

↓ s1041: video source apparatus cancels modified frame structure

↓ s1042: video source apparatus cancels link quality measurement feedback time slot of modified frame structure

↓ s1043: video source apparatus transmits video data to all sensors/nodes/terminals using new modified frame structure

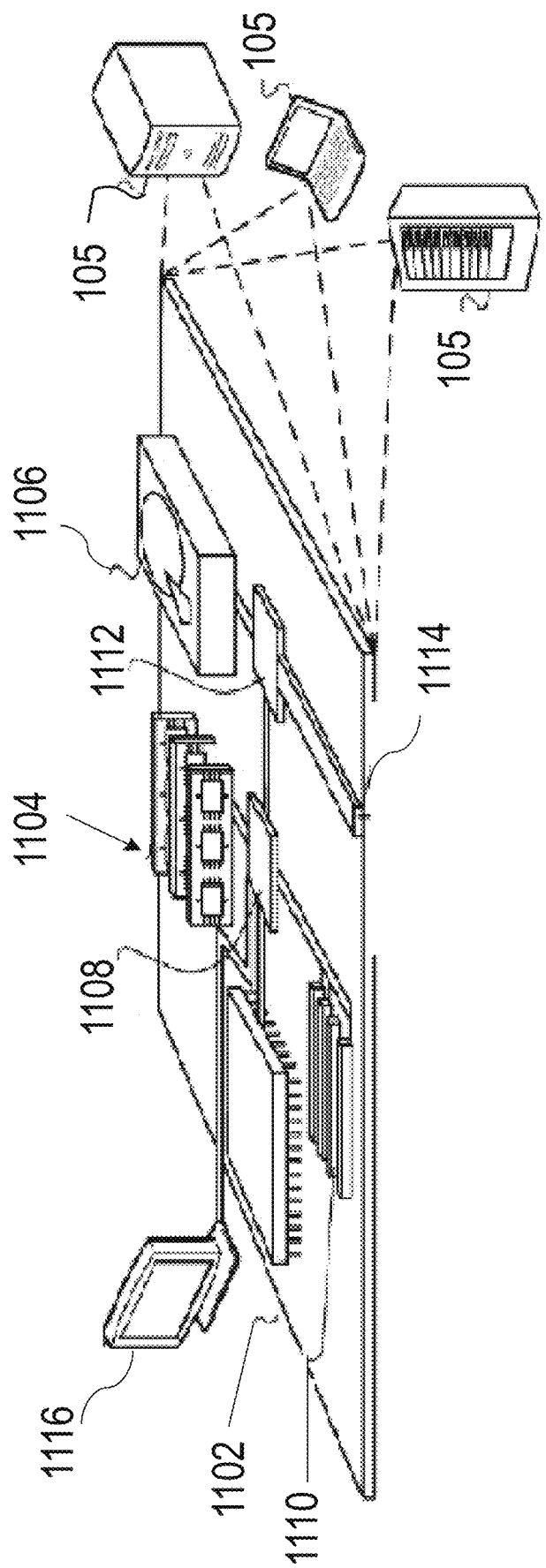

SYSTEM, APPARATUS, AND METHOD FOR IMPROVING TRANSMISSION RESOURCE ALLOCATION IN TRANSPORTING VIDEO CONTENT

FIELD

The present disclosure generally relates to video transport systems and, more specifically, to a system and method for improving resource allocation and fidelity of transported video content.

BACKGROUND

With the continued developments in network and video capture technologies, the distribution of video content has undergone significant advancements, both in the quality of distributed video content and the varied modes by which such content is distributed or transported. A common mode for video content distribution has been through unicast, multicast, or broadcast transmissions among networked computing devices.

Such distribution systems have advanced along with the continued improvements in network technologies. However, such systems share communication resources with other applications and can, therefore, suffer slowdowns and/or interference from other network applications consuming the shared resources.

As such there is a need for a dedicated video content transport system and method for applications that require high fidelity, such as for remote medical procedures, or the like.

SUMMARY

In view of the foregoing, the present disclosure generally relates to a video content transport system and method that utilizes a video transmission platform for allocating bandwidth resources and ensuring fidelity of transported video content.

According to one or more example implementations of the present disclosure, a system and method for processing and transporting video content includes a link quality measurement and data transmission method and device based on multi-channel cross-slot resource allocation. The link quality of display nodes and/or video terminals, such as in medical applications, or the like, can be measured at all link topology levels in a multi-channel system. The measured link quality can include, for example, different performance parameters, round-trip delay, or the like. The display nodes and/or video terminals for various application purposes can use different cross-slot resource allocation strategies for effective allocation and video data transmission. Accordingly, a compromise between the complexity of cross-slot resource allocation, resource utilization, and throughput of video image processing systems can be made to meet special requirements of video image processing systems in different application scenarios, such as in the medical field or the like.

In one or more example implementations, link quality measurement and multi-channel cross-slot allocation signaling are executed using a communication protocol that includes, but is not limited to, a link quality measurement enable field, a resource interval link quality measurement header field, a slot resource allocation list field, a cross-slot resource allocation strategy selection field, and a link quality measurement feedback field. Accordingly, the communication protocol allows for complete link quality measurement between video source apparatuses, nodes, and/or video terminals, as well as signaling and state interaction when allocating slot resources to different time slot resource intervals based on channel/link topology hierarchy/performance parameters/application purposes.

In one or more example implementations, a resource interval link quality measurement header field is used for link quality measurement and multi-channel cross-slot allocation signaling, the field including but not limited to: a channel indicator byte, a link topology level indicator byte, an application purpose indicator byte. The header field is used to mark different resource intervals during multi-channel cross-slot resource allocation. In certain embodiments, when the link quality measurement usage field is enabled, the resource interval link quality measurement field is enabled.

In one or more example implementations, the system and method for processing and transporting video content includes features for defining one or more multi-channel cross-slot resource allocation strategies for multi-channel quality measurement and data transmission, which are used for video source apparatuses to select the one or more multi-channel cross-slot resource allocation strategies for any and all nodes and/or video terminals on any and all link topologies on any and all channels. In certain embodiments, the one or more strategies can include cross-slot resource scheduling and allocation methods, as well as video data transmission methods.

In one or more exemplary embodiments, the one or more allocation strategies include one or more specific types of cross-slot resource allocation strategies for multi-channel quality measurement and data transmission in multi-channel cross-slot resource allocation, including but not limited to: a real-time display priority strategy for video data transmission with low round-trip latency requirements; a synchronous display priority strategy for sending video data with the same round-trip delay requirements; an image retention display priority strategy, used for sending video data with low refresh rate and unchanged video data; a collaborative display priority strategy for sending video data with brief changes in performance parameters; a retransmission display correction strategy, alternative strategy type, used for video data retransmission correction; and a standard frame structure time slot resource allocation strategy, which can only be used for video data transmission under standard frame structure.

In one or more example implementations, the system and method for processing and transporting video content includes features for cross-slot resource scheduling and allocation based on link quality measurements and multi-channel cross-slot allocation signaling. In certain embodiments, a video source apparatus pre-allocates different time slot resource intervals to time slot resource channels, link topology levels, performance parameters, and/or application purposes.

In one or more example implementations, a node and/or video terminal for receiving video content processed according to the present disclosure sets up a multi-channel slot resource allocation register, which includes but is not limited to: cross-slot allocation bytes, channel allocation bytes, link topology level allocation bytes, and application purpose allocation bytes. The register is used for link quality measurement and data transmission process of the node and/or video terminal in multi-channel cross-slot resource allocation. Thus, in certain embodiments, the node and/or video terminal can modify its own cross-slot resource allocation status and configure different bytes in the multi-channel slot resource allocation register to determine its own channel, link topology layer level, and application purpose. In one or more embodiments, the node and/or video terminal can complete link quality measurements and data transmissions for multi-channel resource allocation according to link quality measurements and multi-channel cross-slot allocation signaling markers.

In one or more exemplary implementations, the system and method for processing and transporting video content uses a link quality measurement and data transmission frame structure based on multi-channel cross-slot resource allocation that is based on a standard frame structure with modified pixel data time slots. In certain embodiments, the pixel data time slots are divided into pixel data sub time slots and each pixel data sub time slot is divided into non-cross-slot allocation time slots. Cross-slot allocation bytes are added to all non-cross-slot allocation time slots, the cross-slot allocation bytes including but not limited to channel allocation bytes, link topology level allocation bytes, and application purpose allocation bytes, which are used to identify the non-cross-slot allocation time slots.

In one or more exemplary implementations, the system and method for processing and transporting video content uses a frame structure for link quality measurement and data transmission based on multi-channel cross-slot resource allocation that is based on a standard frame structure with added time slots, which include but are not limited to link quality measurement enable time slots, resource interval link quality measurement header time slots, time slot resource allocation list time slots, cross-slot resource allocation strategy selection time slots, and link quality measurement feedback time slots.

According to one or more example implementations of the present disclosure, a method comprises: enabling, at a video source apparatus, link quality measurement for one or more communication links to corresponding one or more video display nodes; initializing, at the video source apparatus, one or more resource interval link quality measurement fields; transmitting, from the video source apparatus to the one or more video display nodes, link quality measurement and multi-channel cross-slot allocation signaling; receiving, at the video source apparatus, one or more link quality measurements for the respective one or more communication links; selecting, at the video source apparatus, at least one multi-channel cross-slot allocation strategy for each of the one or more video display nodes based on the received one or more link quality measurements; signaling the selected at least one multi-channel cross-slot allocation strategy to the one or more video display nodes using the one or more resource interval link quality measurement fields; transmitting, from the video source apparatus to the one or more video display nodes via the respective one or more communication links, video data using a modified video data transmission frame structure communication protocol and based on the selected at least one multi-channel cross-slot allocation strategy; and upon receiving confirmation of correct reception of the video data from the one or more video display nodes, cancelling, at the video source apparatus, the modified video data transmission frame structure communication protocol.

In one or more example implementations, the one or more resource interval link quality measurement fields each comprise a channel indicator, a link topology level indicator, and an application purpose indicator.

In one or more example implementations, the application purpose indicator indicates one or more of a video data transmission, a collaboration data transmission, a data retransmission, and a performance parameter change.

In one or more example implementations, the one or more resource interval link quality measurement fields each correspond to a slot resource allocation list field.

In one or more example implementations, each of the one or more video display nodes maintains a multi-channel slot resource allocation register for comparing with the slot resource allocation list field and the one or more resource interval link quality measurement fields.

In one or more example implementations, the method further comprises: when one of the one or more video display nodes determines a difference between the multi-channel slot resource allocation register and one or more of the slot resource allocation list field and the one or more resource interval link quality measurement fields, receiving, at the video apparatus from the one video display node, a link quality measurement feedback correction.

In one or more example implementations, the modified video data transmission frame structure communication protocol comprises a revised video data transmission time slot, the revised video data transmission time slot comprises a plurality of pixel data sub slots, and each of the plurality pixel data sub slots comprises one or more allocation time slots having a time slot allocation indicator, a channel allocation indicator, a link topology level allocation indicator, and application purpose allocation indicator for a corresponding one or more non-cross-slot resource.

In one or more example implementations, the link quality measurements comprise one or more of a channel throughput determination, a link topology level throughput determination, and an application purpose throughput determination.

In one or more example implementations, the at least one multi-channel cross-slot allocation strategy is selected from the group consisting of: a real-time display priority strategy, a synchronous display priority strategy, an image retention display priority strategy, a collaborative display optimization strategy, a retransmission display correction strategy, and a standard frame structure time slot resource allocation strategy.

According to one or more example implementations of the present disclosure, a video source apparatus, comprises: a communication interface to one or more video display nodes; a processor operatively connected to the communication interface; and a memory storage operatively connected to the processor and having stored thereon machine-readable instructions that cause the processor, when executed, to: enable link quality measurement for one or more communication links to the one or more video display nodes; initialize one or more resource interval link quality measurement fields; transmit, to the one or more video display nodes, link quality measurement and multi-channel cross-slot allocation signaling; receive one or more link quality measurements for the respective one or more communication links; select at least one multi-channel cross-slot allocation strategy for each of the one or more video display nodes based on the received one or more link quality measurements; signal the selected at least one multi-channel cross-slot allocation strategy to the one or more video display nodes using the one or more resource interval link quality measurement fields; transmit, to the one or more video display nodes via the respective one or more communication links, video data using a modified video data transmission frame structure communication protocol and based on the selected at least one multi-channel cross-slot allocation strategy; and upon receiving confirmation of correct reception of the video data from the one or more video display nodes, cancel the modified video data transmission frame structure communication protocol.

In one or more example implementations, the one or more resource interval link quality measurement fields each comprise a channel indicator, a link topology level indicator, and an application purpose indicator.

In one or more example implementations, the application purpose indicator indicates one or more of a video data transmission, a collaboration data transmission, a data retransmission, and a performance parameter change.

In one or more example implementations, the one or more resource interval link quality measurement fields each correspond to a slot resource allocation list field.

In one or more example implementations, each of the one or more video display nodes maintains a multi-channel slot resource allocation register for comparing with the slot resource allocation list field and the one or more resource interval link quality measurement fields.

In one or more example implementations, the machine-readable instructions, when executed, further cause the processor to: when one of the one or more video display nodes determines a difference between the multi-channel slot resource allocation register and one or more of the slot resource allocation list field and the one or more resource interval link quality measurement fields, receive, from the one video display node, a link quality measurement feedback correction.

In one or more example implementations, the modified video data transmission frame structure communication protocol comprises a revised video data transmission time slot, the revised video data transmission time slot comprises a plurality of pixel data sub slots, and each of the plurality pixel data sub slots comprises one or more allocation time slots having a time slot allocation indicator, a channel allocation indicator, a link topology level allocation indicator, and application purpose allocation indicator for a corresponding one or more non-cross-slot resource.

In one or more example implementations, the link quality measurements comprise one or more of a channel throughput determination, a link topology level throughput determination, and an application purpose throughput determination.

In one or more example implementations, the at least one multi-channel cross-slot allocation strategy is selected from the group consisting of: a real-time display priority strategy, a synchronous display priority strategy, an image retention display priority strategy, a collaborative display optimization strategy, a retransmission display correction strategy, and a standard frame structure time slot resource allocation strategy.

According to one or more example implementations of the present disclosure, a system, comprises: one or more video display nodes; a video source apparatus communicatively coupled to the one or more video display nodes via respective one or more communication links, said video source apparatus comprising: a processor; and a memory storage operatively connected to the processor and having stored thereon machine-readable instructions that cause the processor, when executed, to: enable link quality measurement for the one or more communication links to the one or more video display nodes; initialize one or more resource interval link quality measurement fields; transmit, to the one or more video display nodes, link quality measurement and multi-channel cross-slot allocation signaling; receive one or more link quality measurements for the respective one or more communication links; select at least one multi-channel cross-slot allocation strategy for each of the one or more video display nodes based on the received one or more link quality measurements; signal the selected at least one multi-channel cross-slot allocation strategy to the one or more video display nodes using the one or more resource interval link quality measurement fields; transmit, to the one or more video display nodes via the respective one or more communication links, video data using a modified video data transmission frame structure communication protocol and based on the selected at least one multi-channel cross-slot allocation strategy; and upon receiving confirmation of correct reception of the video data from the one or more video display nodes, cancel the modified video data transmission frame structure communication protocol.

In one or more example implementations, the one or more resource interval link quality measurement fields each correspond to a slot resource allocation list field, each of the one or more video display nodes maintains a multi-channel slot resource allocation register for comparing with the slot resource allocation list field and the one or more resource interval link quality measurement fields, and at least one of the one or more video display nodes transmits a link quality measurement feedback correction to the video source apparatus when the at least one video display node determines a difference between the multi-channel slot resource allocation register and one or more of the slot resource allocation list field and the one or more resource interval link quality measurement fields.

BRIEF DESCRIPTION OF THE DRAWINGS

Various example implementations of this disclosure will be described in detail, with reference to the following figures, wherein:

FIG. 8A is a diagram depicting a first portion of a modified frame structure for a link quality measurement communication protocol of the video source apparatus of FIG. 1 according to one or more example implementations of the present disclosure.

FIG. 8B is a diagram depicting a second portion of the modified frame structure of FIG. 8A.

FIG. 10D is a fourth portion of the flow diagram continuing from FIG. 10C.

FIG. 10E is a fifth portion of the flow diagram continuing from FIG. 10D.

FIG. 10F is a sixth portion of the flow diagram continuing from FIG. 10E.

FIG. 10H is an eighth portion of the flow diagram continuing from FIG. 10G.

FIG. 10I is a ninth portion of the flow diagram continuing from FIG. 10H.

FIG. 11 is a schematic diagram showing an example video source apparatus of FIG. 1 that can be used to implement the techniques described herein.

DETAILED DESCRIPTION

Figure 1:
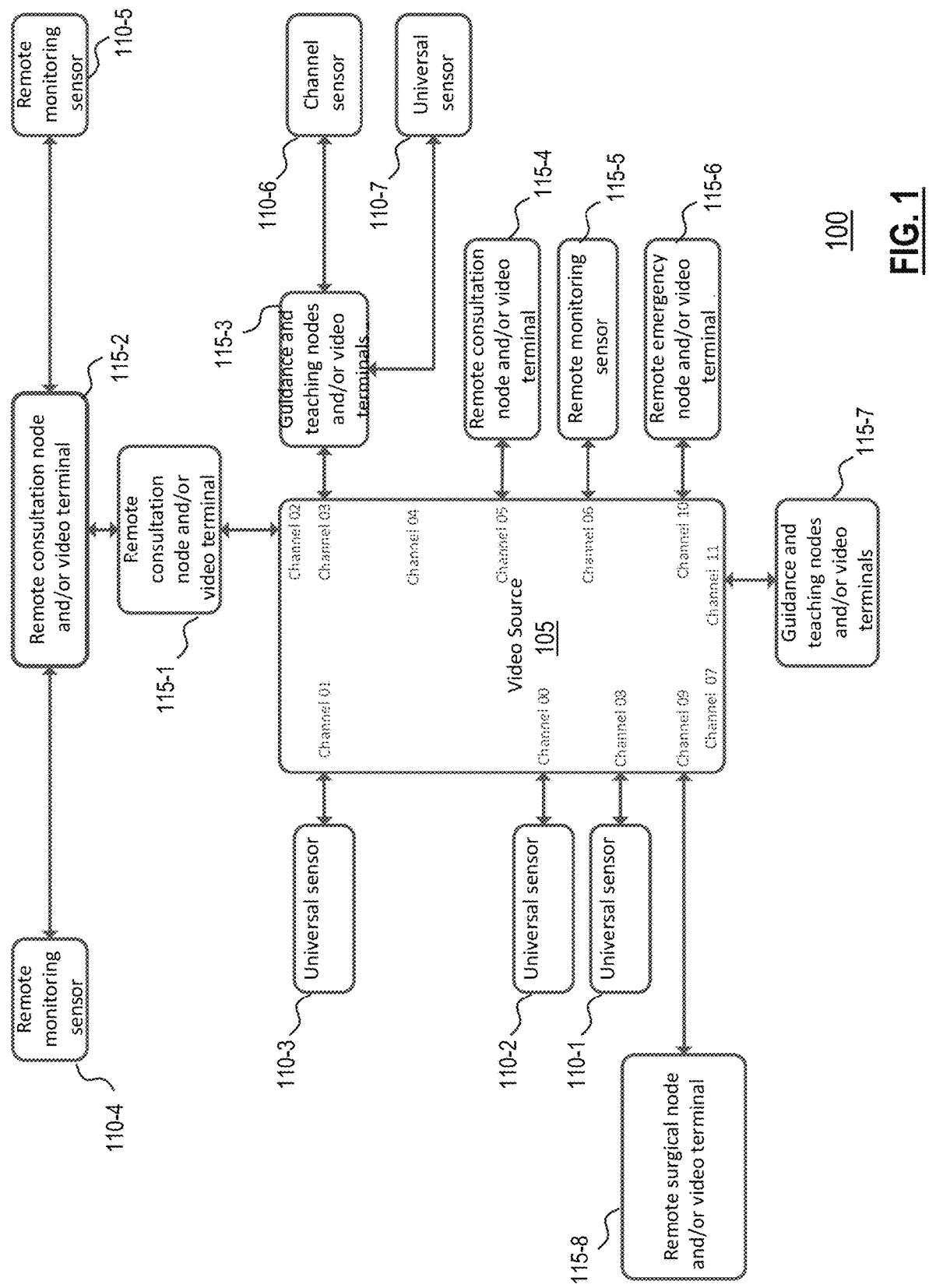
FIG. 1 is a schematic diagram of a video transport system according to one or more example implementations of the present disclosure.

FIG. 1 is a schematic diagram of a video transport (or transmission) system 100 according to one or more example implementations of the present disclosure.

As illustrated in FIG. 1, system 100 includes a video source apparatus 105. According to one or more exemplary implementations, video source apparatus 105 includes a computing apparatus (see FIG. 11) that is adapted to obtain captured video content and transport the obtained video content to one or more devices that are communicatively connected to video apparatus 105 via respective channels, for example, channels 00 to 11 illustrated in FIG. 1. Accordingly, video source apparatus 105 can capture video content via one or more cameras, video sensors, image processors, imaging devices, optical probes, endoscopes, microscopes, or the like (not shown) as peripheral and/or integrated elements. Video source apparatus 105 can also comprise one or more memory storage devices (1104, 1106 in FIG. 11) adapted to retain the captured video content data and/or content obtained from another device (e.g., through a network connection) for transport, for example, to one or more sensors, terminals and/or nodes. As shown in FIG. 1, video source apparatus 105 obtains and transports the video content via channels 00 to 11. In certain embodiments, video source apparatus 105 can be used in the fields of remote surgery, remote consultation, guidance and teaching, remote monitoring, remote first aid, or the like, in the medical field.

One of ordinary skill in the art will appreciate that video source apparatus 105 is not limited to the number of channels 00 to 11 shown in FIG. 1 and can have any number m of channels (m>=0), each of which can be applied to different medical application scenarios. One of ordinary skill in the art will also appreciate that the arrangement illustrated in FIG. 1 is for illustrative purposes only and that the number and arrangement of elements connected to video source apparatus 105 are not limited to the precise example shown.

As illustrated in FIG. 1, video source apparatus 105 is communicatively connected to universal sensor 110-1, universal sensor 110-2, universal sensor 110-3 via channels 08, 00, and 01, respectively. In one or more exemplary embodiment, sensors 110 are biosensors and/or medical detection equipment that require image retention and display with low latency and low throughput requirements for video data transmission with low performance parameter. In the example shown, "universal" denotes the sensor 110 being usable via all channels for receiving video content data from video source apparatus 105.

As further illustrated in FIG. 1, video source apparatus 105 is connected to nodes and/or video terminals 115 for transporting video content thereto, which video content can be captured by, obtained, and/or stored at video source apparatus 105. In certain embodiments, the video content can be transported to nodes/video terminals 115 via video source apparatus 105 from one or more memory storages (1104, 1106 in FIG. 11), such as video archives or the like, communicatively coupled to video source apparatus 105. Nodes/video terminals 115 can also be coupled to one or more local sensors 110 to which video content is transported from video source apparatus 105. For example, as shown in FIG. 1, remote consultation node(s) and/or terminal(s) 115-1 is connected to video source apparatus 105 via a channel 02. Remote consultation node(s) and/or terminal(s) 115-1 is connected to remote consultation node(s) and/or terminal(s) 115-2, which is connected to remote monitoring sensor 110-4 and remote monitoring sensor 110-5.

A guidance and teaching node(s) and/or video terminal(s) 115-3 is connected to video source apparatus 105 via a channel 03 and is, in turn, connected to a channel sensor 110-6 and a universal sensor 110-7. In one or more example implementations, channel sensor 110-6 is coupled to guidance and teaching node(s) and/or video terminal(s) 115-3 via one or more predetermined channels through which video content can be transported. Universal sensor 110-7 can, likewise, receive content via guidance and teaching node(s) and/or video terminal(s) 115-3 from video source apparatus 105.

FIG. 1 illustrates an example arrangement that further includes a remote consultation node(s) and/or terminal(s) 115-4 connected to video source apparats 105 via a channel 05, a remote monitoring sensor 115-5 connected to video source apparatus 105 via a channel 06, a remote emergency node(s) and/or video terminal(s) 115-6 connected to video source apparatus 105 via a channel 10, a guidance and teaching node(s) and/or video terminal(s) 115-7 via a channel 11, and a remote surgical node(s) and/or video terminal(s) 115-8 via a channel 09. In the example illustrated in FIG. 1, channels 04 and 07 are unused but one of ordinary skill in the art will recognize that one or more sensors 110 and/or nodes/terminals 115 can been connected to video source apparatus 105 via these channels. Thus, the channels of video source apparatus 105 can be in a used state or an unused state.

Channels 00-11 shown in FIG. 1 are assigned communication channels of video source apparatus 105 for communications with sensors 110 and nodes/terminals 115. In one or more example implementations, the communications are executed through wired connections between video source apparatus 105 and sensors 110 and nodes/terminals 115 that conform to one or more video display and interface standards, such as VESA (Video Electronics Standards Association), DisplayPort, MIPI (Mobile Industry Processor Interface), HDMI (High Definition Multimedia Interface), to name a few. The operations of channels 00-11 and the attendant resource allocation among them will be described in further detail below. One of ordinary skill in the art will appreciate that these operations are applicable to other data transmission protocols without departing from the spirit and scope of the present disclosure.

In one or more exemplary embodiments, for all medical field application scenarios, each node and/or video terminal 115 can connect to different sensors 110 and/or node(s)/terminal(s) 115 in different medical application scenarios. In certain embodiments, for specific medical application scenarios, video source apparatus 105 can establish one or more groups for nodes and/or video terminals 115 for the medical application scenario. Thus, video source apparatus 105 performs unified link quality measurements and data transmissions based on cross-slot resource allocations by the established groups, which can significantly reduce the scheduling and resource allocation complexity of multi-channel cross-slot resource allocation for video sources, such as video source apparatus 105 and the like.

Figure 2:
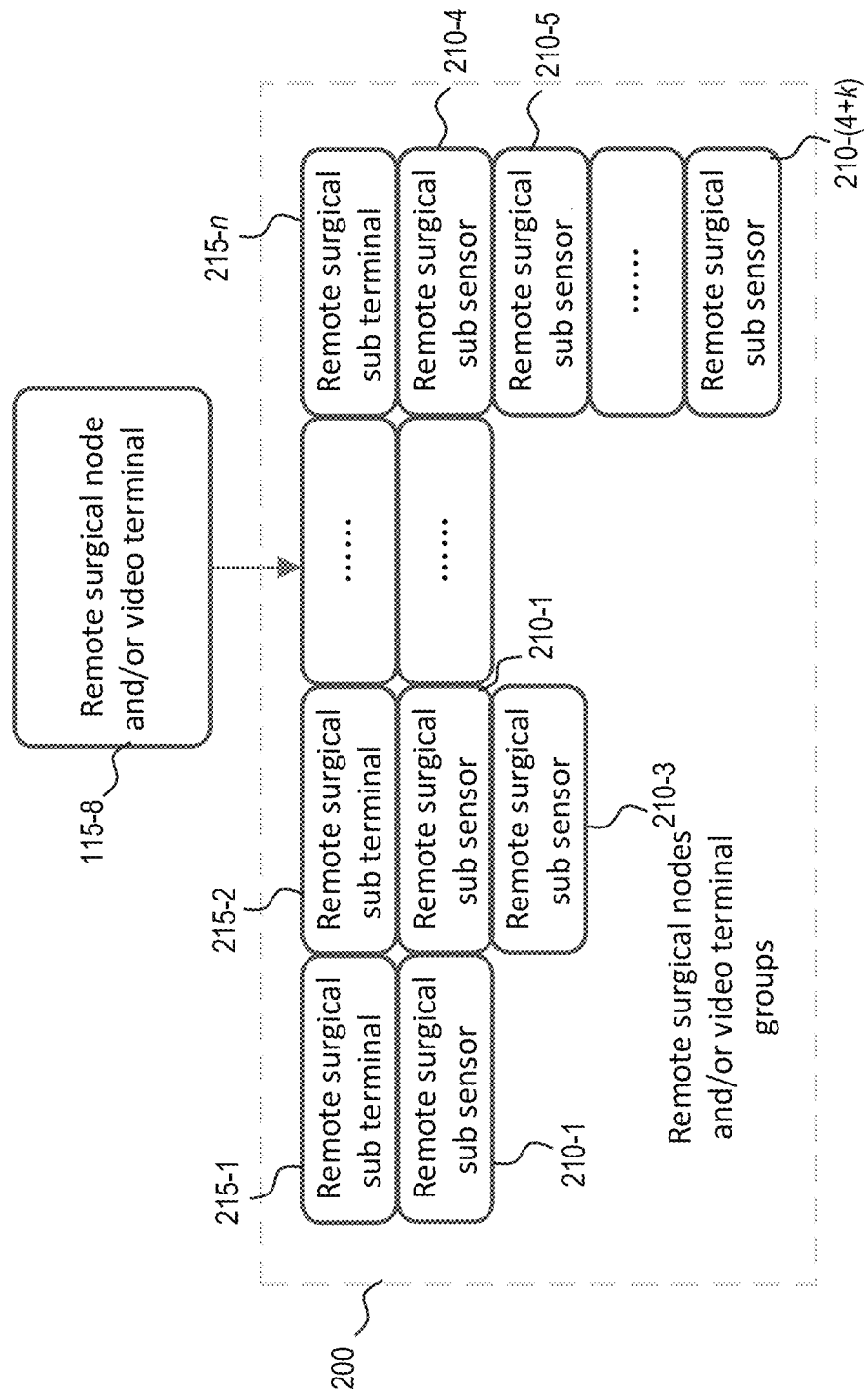
FIG. 2 is a schematic diagram that illustrates a remote group in communication with the video transport system of FIG. 1 according to one or more example implementations of the present disclosure.

FIG. 2 is a schematic diagram that illustrates a remote group 200 that is connected to one of the nodes/terminals 115-8 illustrated in FIG. 1 according to one or more example implementations of the present disclosure.

As illustrated in FIG. 2, remote surgical node/terminal group 200 contains multiple columns of subgroups that are each comprised of one or more respective sub sensors 210 and sub terminals 215. Sub sensors 210 can be sensor elements that correspond to sensors 110 shown in FIG. 1, and sub terminals 215 can be nodes/terminal elements that correspond to nodes/terminals 115 shown in FIG. 1. In the example shown in FIG. 2, group 200 contains a first subgroup of a remote surgical sub sensor 210-1 and a remote surgical sub terminal 215-1; a second subgroup of two remote surgical sub sensors 210-2 and 210-3, and a remote surgical sub terminal 215-2; and an n-th (n>=1) subgroup of k (k>=1) remote surgical sub sensors 210-4, 210-5, and 210-(4+k), and a remote surgical sub terminal 215-n.

Thus, according to one or more example implementations, video source apparatus 105 can communicate with group 200 as a unitary entity via node/terminal 115-8 to reduce complexity of communicating with each element of group 200. In the following, sensors 210 and sub terminals 215 can be included when sensors 110 and/or nodes 115 are referred to collectively.

For system 100 illustrated in FIGS. 1 and 2, which is adaptable to medical field applications, there can be special requirements including, but not limited to:
 a. real-time display with low latency may be required in remote surgeries, as well as throughput requirements for video data transmission with high performance parameters, such as high resolution, large BPC (Bits Per Component), high frame rate, to name a few;
 b. in remote consultations, guidance, and lectures, video data may need to be transmitted to various biosensors and medical detection equipment that require image retention and display, with low latency and low throughput requirements for video data transmission with low performance parameters;
 c. at the same time, large amounts of video data with high performance parameters with high throughput of video data transmissions may be required for remote consultations and guidance, as well as real-time on-site images of patients in lectures; and
 d. in remote monitoring, medical monitoring, and first aid, video data with high concurrency and low performance parameters with low video data transmission volume may need to be transmitted.

Accordingly, video source apparatus 105 and/or one or more of the other elements of system 100 incorporates a multi-channel cross-slot resource allocation and data transmission process that is based, at least in part, on link quality measurements to meet these requirements.

By measuring the link quality of sensors 110 and nodes 115 at all link topology levels in a multi-channel process, data transmission resources can be allocated accordingly. In certain embodiments, the process can take into account application purposes of sensors 110 and nodes 115 by assigning different cross-slot resource allocation strategies for effective allocations and video data transmissions. Advantageously, the present disclosure provides for a compromise between the complexity of cross-slot resource allocation/utilization and throughput of transmitted video data to meet the special requirements of video image processing systems in different application scenarios in medical fields.

Next, a link quality measurement communication protocol for system 100 and/or video source apparatus 105 is described.

Figure 3:
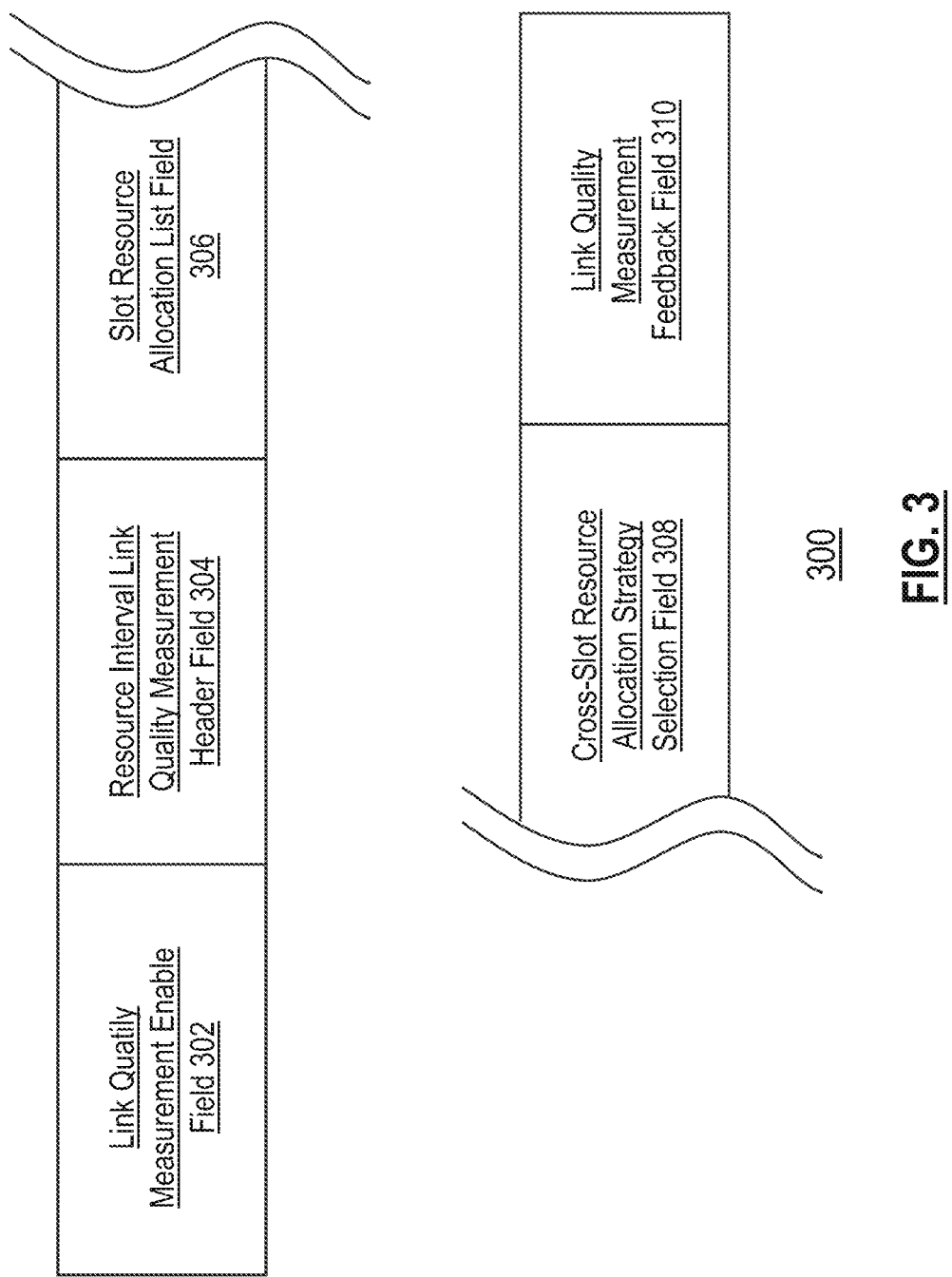
FIG. 3 is a schematic diagram of a link quality measurement and multi-channel cross-slot allocation signal frame according to one or more example implementations of the present disclosure.

FIG. 3 is a schematic diagram of a link quality measurement and multi-channel cross-slot allocation signal frame 300 according to one or more example implementations of the present disclosure.

As illustrated in FIG. 3, signal frame 300 includes a link quality measurement enable field 302, which is used to enable/disable link quality measurement and multi-channel cross-slot allocation signaling. When field 302 is enabled, a resource interval is set for a resource interval link quality measurement header field 304 to identify different resource intervals. When field 302 is disabled, the resource interval is disabled for resource interval link quality measurement header field 304 to reduce signaling overhead and improve time-slot resource utilization.

Correspondingly, resource interval link quality measurement header field 304 is used to mark different resource intervals and information for performing one or more quality measurements on corresponding one or more links to video source apparatus 105, sensor(s) 110 (210), and/or node(s) 115 (215). According to one or more example implementations, field 304 also contains specific link quality measurement sequences to adapt to different link quality measurement requirements.

Slot resource allocation list field 306 is used for allocating all slot resources in advance according to the marked resource intervals in link quality measurement header field 304, for example, by the video source apparatus 105. Accordingly, field 306 is used for resource allocation, which can account for channel/link topology hierarchy/performance parameters/application purposes.

Cross-slot resource allocation strategy selection field 308 is used for selecting one or more multi-channel cross-slot resource allocation strategies for all sensor(s) 110 (210) and/or node(s) 115 (215) on all link topologies on all channels, for example, by video source apparatus 105. In certain embodiments, the strategy(ies) includes cross-slot resource scheduling and allocation methods, as well as video data transmission methods.

Link quality measurement feedback field 310 is used for signaling and state interaction among video source apparatus 105, sensors 110 (210), and nodes 115 (215) in the link quality measurement protocol.

Figure 4:
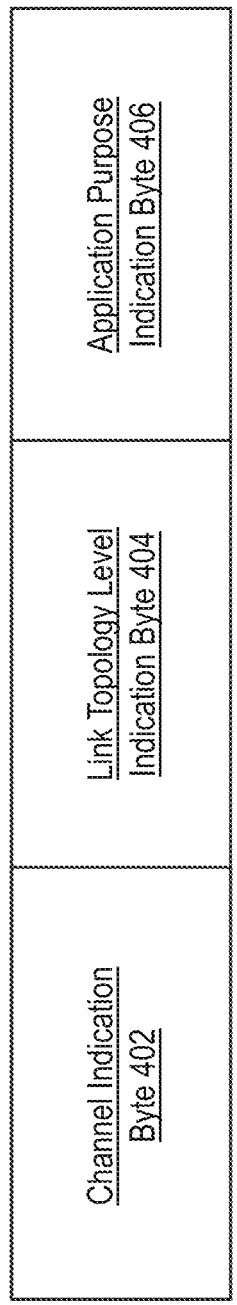
FIG. 4 is a schematic diagram of the resource interval link quality measurement header field of FIG. 3 according to one or more example implementations of the present disclosure.

FIG. 4 is a schematic diagram of resource interval link quality measurement header field 304 according to one or more example implementations of the present disclosure.

As illustrated in FIG. 4, resource interval link quality measurement header field 304 includes a channel indication byte 402, a link topology level indication byte 404, and an application purpose indication byte 406.

Channel indication byte 402 is used to indicate one or more channel numbers that can use a marked resource interval. In certain embodiments, when a marked resource interval is associated with multiple channels, video source apparatus 105 has the option to search for use or not to search for use of the marked resource interval for cross-time slot resource allocation.

Link topology level indicator byte 404 is used to indicate the link topology level that can use a marked resource interval. In certain embodiments, the link topology level indicator field 404 only indicates the link topology level of the sensor(s) 110 (210) and/or node(s) 115 (215) that can use a marked resource interval. When the channel indicator field 402 indicates a single channel, sensor(s) 110 (210) and/or node(s) 115 (215) at the link topology level indicated at the link topology level indicator field 404 would only use a marked resource interval on a single channel. When the channel indicator field 402 indicates multiple channels, sensor(s) 110 (210) and/or node(s) 115 (215) at the link topology level indicated at the link topology level indicator field 404 would use a marked resource interval on multiple channels indicated at the channel indicator field 402. In certain embodiments, video source apparatus 105 can choose to search for and use/not search for cross-time slot resources based on a marked resource interval corresponding to the link topology hierarchy indicator byte 404.

Application purpose indication byte 406 is used to indicate the purpose for which a marked resource interval is used. In one or example implementations, the different application purposes indicated at byte 406 include collaboration, error correction/retransmission, and performance parameter changes. In certain embodiments, additional application purposes can be included, such as synchronous display as an example. Application purpose indication byte 406 can indicate a single purpose or multiple purposes across sensor(s) 110 (210) and/or node(s) 115 (215) on different channels (indicated at channel indication byte 402) and/or link topology levels (indicated at link topology level indication byte 404) to improve a resource utilization rate within a resource range.

Table 1 below illustrates information included in slot resource allocation list field 306 in correspondence with channel indication byte 402, link topology level indication byte 404 and application purpose indication byte 406 of resource interval link quality measurement header field 304 according to an exemplary embodiment of the present disclosure.

TABLE 1

| Time slot resource sequence number | Channel indication | Link topology level indication | Application purpose indication |
|---|---|---|---|
| 00 | 1, 3 | 1, 2, 4 | Video data transmission |
| 01 | 2, 4, 6 | 1, 3, 6 | Collaborative data transmission |
| 02 | 1, 4, 6 | 2, 5, 6 | Retransmission data transmission |

In the example shown in Table 1, each time slot resource sequence number is corresponded to channel(s) indicated at channel indication byte 402, link topology level(s) indicated at link topology level indication byte 404, application purpose(s) indicated at application purpose indication byte 406, thereby associating the respective time slot(s) for the respective marked time interval(s) to the respective indication bytes 402, 404, and 406.

Referring back to FIG. 3, the respective resource allocation strategies that can be indicated at cross-slot resource allocation strategy selection field 308 will be described.

According to one or more exemplary embodiments in medical field applications, the resource allocation strategies include, but are not limited to: real-time display (low latency delay) priority strategy, synchronous display (same latency delay) priority strategy, image retention display (low refresh rates) priority strategy, collaborative display (short-term performance parameter changes) optimization strategy, retransmission display (alternative strategy for video data retransmission correction in non-important situations) correction strategy, and standard frame structure time slot resource allocation strategy.

According to one or more exemplary implementations, video source apparatus 105 selects the real-time display priority strategy when very low latency for video data transmission is required. Therefore, when allocating slot resources for one or more of sensor(s) 110 (210) and/or node(s) 115 (215) that need to be display video content synchronously, video source apparatus 105 would need to enable link quality measurement and set multi-channel cross-slot allocation signaling in the slot resource allocation list field 306 to prioritize selecting links with lower channel throughput and fewer link topology levels to send the video data. Additionally, under this strategy, video source apparatus 105 is adapted to prioritize the use of non-cross-slot allocated resources (see 912 in FIG. 9) to ensure that video source apparatus 105 schedules time slot resources with less latency, thereby ensuring video data transmission under very low round-trip latency in this strategy. Moreover, cross-slot resource allocation is only used when the performance parameters of any of sensor(s) 110 (210) and/or node(s) 115 (215) change, and video source apparatus 105 cannot schedule sufficient time slot resources on non-cross-slot allocated resources. In one or more exemplary embodiments, when selecting cross-slot resource allocation, the cross-slot resources at the same channel and link topology level are selected for allocation to ensure video data transmission with minimal round-trip latency.

Video source apparatus 105 selects the synchronous display priority strategy when video data is to be displayed in sync and with minimal delay. Accordingly, this strategy prioritizes same round-trip delays among links to sensor(s) 110 (210) and/or node(s) 115 (215). This strategy is mainly used in display scenarios with high real-time performance and low round-trip latency for synchronous display. In one or more exemplary embodiments, there are three ways for video source apparatus 105 to allocate slot resources for sensor(s) 110 (210) and/or node(s) 115 (215) that require synchronous display.

One way is for video source apparatus 105 to select the slot resource allocation list field 306 for link quality measurement and multi-channel cross-slot allocation signaling based on video source apparatus 105 settings, select the same channel (402) and link topology level (404) for sensor(s) 110 (210) and/or node(s) 115 (215) that need to be displayed synchronously, and set all application purposes to synchronous display. The advantage of this approach is it prioritizes sensor(s) 110 (210) and/or node(s) 115 (215) that need to be synchronized for display having the same link quality. Therefore, it can ensure that the round-trip latency during video data transmission and display is the same or similar. Therefore, it can maximize the assurance that sensor(s) 110 (210) and/or node(s) 115 (215) that need to be synchronized for display under the same step display priority strategy obtain the best display effect at the lowest possible round-trip latency. A disadvantage of this strategy is that when the throughput in video source apparatus 105 is high, video source apparatus 105 requires complex cross-slot resource allocation algorithms to select time slot resources with the same or similar round-trip latency. At the same time, it requires the most non-cross-slot resources. Moreover, if cross-slot resources are selected, video source apparatus 105 needs to first complete the synchronization of non-cross-slot resources and cross-slot resources. Furthermore, sending video data on both non-cross-slot and cross-slot resources simultaneously potentially increases round-trip latency and may reduce the real-time performance of the synchronous display. This strategy is mainly used for when video source apparatus 105 has high requirements for synchronous display, completing synchronous display based on the use of the most non-cross-time slot resources and the minimum latency.

Another way is for video source apparatus 105 to select most sensor(s) 110 (210) and/or node(s) 115 (215) in the same channel (402) and link topology level (404) in the slot resource allocation list field 306 based on link quality measurement and multi-channel cross-slot allocation signaling. The remaining sensor(s) 110 (210) and/or node(s) 115 (215) are allocated to the slot resource allocation list field 306 of link quality measurement and multi-channel cross-slot allocation signaling to other channels (402) and/or link topology levels (404). When video source apparatus 105 allocates resources across time slots, if the throughput of video source apparatus 105 is high, video source apparatus 105 can place most sensor(s) 110 (210) and/or node(s) 115 (215) located in the same channel and link topology level to be synchronized and displayed on the resources allocated across time slots. The advantage of this time slot resource allocation is that it can reduce the latency value in a limited manner while ensuring the same or similar latency to reduce the latency difference with other waiting sensor(s) 110 (210) and/or node(s) 115 (215) at the remaining channel and/or link topology level. Video source apparatus 105 can complete synchronization display without completing synchronization of non-cross-slot resources and cross-slot resources. Therefore, video source apparatus 105 can ensure that the latency and total synchronization delay are minimized as much as possible. If the throughput of the video source apparatus 105 is small, video source apparatus 105 can place most sensor(s) 110 (210) and/or node(s) 115 (215) that are in the same channel and link topology hierarchy as the sensor(s) 110 (210) and/or node(s) 115 (215) to be synchronized for display on resources that are not allocated across time slots. The advantage of this time slot resource allocation is that it can minimize the latency of sensor(s) 110 (210) and/or node(s) 115 (215) to be synchronized for display, but, due to significant differences in link quality between sensor(s) 110 (210) and/or node(s) 115 (215) on the remaining channel(s) and/or link topology level(s), there may be significant differences in latency. Therefore, video source apparatus 105 needs to first complete transmission synchronization before sending video data to ensure that the latency and total synchronization latency of all synchronized displayed nodes and/or video terminals remain the same as much as possible to ensure the display effect of synchronous display. Video source apparatus 105 prioritizes allocating the remaining channels and/or sensor(s) 110 (210) and/or node(s) 115 (215) at the topology level of the link to non-cross-slot resources in order to minimize significant differences in latency caused by link quality differences, and thus ensure the display effect of synchronized video data. This strategy is mainly used when video source apparatus 105 has moderate synchronous display requirements, achieving synchronous display while maintaining a compromise between slot resource allocation and total latency.

A third way is for video source apparatus 105 to select the sensor(s) 110 (210) and/or node(s) 115 (215) to be synchronized for display based on link quality measurement and the slot resource allocation list field 306 of multi-channel cross-slot allocation signaling as their confirmed channels, link topology levels, and application purposes. Video source apparatus 105 dynamically allocates available slot resources, including cross-slot resources and non-cross-slot resources, based on the throughput of the video source apparatus 105. After video source apparatus 105 completes strict synchronization of video data transmission, the video data is sent. The advantage of this strategy is that the time slot resource allocation of video source apparatus 105 is the simplest, minimizing the complexity of cross-time slot resource allocation of video source apparatus 105. The disadvantage is that due to the significant difference in latency of sensor(s) 110 (210) and/or node(s) 115 (215) to be synchronized, video source apparatus 105 requires complex synchronization algorithms to complete transmission synchronization, which may significantly increase the delay of transmission synchronization. This strategy is mainly used to maintain synchronized display and continuously complete the transmission and display of synchronized video data. However, due to the large latency and the total delay of sending synchronization delay, the display effect of synchronized display can be poor.

Video source apparatus 105 selects the image retention display priority strategy when the video display calls for the lowest possible refresh rate, i.e., frame rate, to ensure that the display of video data is completed, and the display status is maintained in the longest possible time. This strategy is mainly used in scenarios where there is no change in video data for a long time, or only low video data transmission volume when there are local changes in video data. In one or more exemplary embodiments, there are three ways for video source apparatus 105 to allocate slot resources for sensor(s) 110 (210) and/or node(s) 115 (215) that operate to display video with substantial image retention.

One way is to prioritize allocating the slot resource allocation list field 306 of video source apparatus 105 based on link quality measurement and multi-channel cross-slot allocation signaling to the resources allocated across time slots. When there is a change in video data and the amount of changed video data is small, video source apparatus 105 temporarily allocates cross-slot resources to meet the transmission needs of changing video data. The advantage of this method is that due to the low real-time display requirements, it can achieve image retention display without the need for a large number of non-cross-time slot resources and complex resource scheduling. Moreover, the requirement for latency is low, so video source apparatus 105 does not need to complete transmission synchronization to meet the image retention display requirements. The disadvantage is that if the image remains displayed for a short period of time, or if the amount of changing video data is large, the total delay of latency and transmission synchronization delay can increase significantly. Therefore, while ensuring the display quality of each sensor(s) 110 (210) and/or node(s) 115 (215) where the image remains displayed, it may not be possible to ensure that sensor(s) 110 (210) and/or node(s) 115 (215) where the image remains displayed are synchronized. This method is mainly used in scenarios where image retention display requirements are high, but synchronous display requirements for sensor(s) 110 (210) and/or node(s) 115 (215) waiting for image retention display are low.

A second way is to prioritize allocating the slot resource allocation list field 306 of video source apparatus 105 based on link quality measurement and multi-channel cross-slot allocation signaling to cross-slot allocated resources. When there is a change in video data and the amount of changed video data is large, video source apparatus 105 pre-allocates cross-slot and/or non-cross-slot resources for the transmission of changed video data. The advantage of this approach is that video source apparatus 105 pre-allocates cross-slot and/or non-cross-slot resources for changing video data. Therefore, video source apparatus 105 can complete the transmission and display of all changed video data within the shortest possible resource scheduling delay, significantly reducing the latency of sending changed video data, and significantly reducing the synchronization delay of sensor(s) 110 (210) and/or node(s) 115 (215) waiting for image display. Furthermore, on the basis of prioritizing maintenance of the image display, the synchronous display requirement is met. The disadvantage of this approach is that due to the need for video source apparatus 105 to pre-allocate cross-slot and/or non-cross-slot resources for changing video data, it can reduce the utilization rate of time slot resources. This method is mainly used when video source apparatus 105 has a large amount of changing video data and a demand for synchronous display.

A third way is for video source apparatus 105 to prioritize allocating the slot resource allocation list field 306 based on link quality measurement and multi-channel cross-slot allocation signaling to non-cross-slot allocated resources. At the same time, video source apparatus 105 pre-allocates non-cross-slot resources for the display of changing video data, and video source apparatus 105 first completes the transmission synchronization of video data, and then maintains the display of video data. The advantage of this approach is that video source apparatus 105 ensures that sensor(s) 110 (210) and/or node(s) 115 (215) that are waiting for images to be displayed maintain their display, while minimizing latency by allocating non-cross-time slot resources and sending synchronization. Therefore, it also ensures the synchronous display requirements of sensor(s) 110 (210) and/or node(s) 115 (215) that are waiting for images to be displayed. The disadvantage of this approach is that it requires a large amount of non-cross-time slot resources, which significantly increases the complexity of resource scheduling by video source apparatus 105 and can lead to high resource utilization, thereby reducing the throughput of video source apparatus 105. This method is mainly used when video source apparatus 105 requires both image retention and synchronous display.

Video source apparatus 105 selects the collaborative display optimization strategy when the synchronization and transmission of low latency video data for some sensor(s) 110 (210) and/or node(s) 115 (215) with short-term performance parameter changes are required. In one or more exemplary embodiments, when allocating slot resources for sensor(s) 110 (210) and/or node(s) 115 (215) that require synchronized display, video source apparatus 105 can select from the following two methods.

One method is for video source apparatus 105 to temporarily allocate the slot resource allocation list field 306 of multi-channel cross-slot allocation signaling based on link quality measurement to non-cross-slot resources, and video source apparatus 105 first completes video data transmission synchronization. The advantage of this method is that it can prioritize synchronous collaborative display of video data while minimizing time slot resources needed. The disadvantage of this method is that video source apparatus 105 needs to temporarily allocate time slot resources for the collaborative display of video data, which increases the complexity of resource scheduling. At the same time, due to the need to first complete transmission synchronization, it can increase latency. This method is mainly used when video source apparatus 105 has a small amount of collaborative display video data.

A second method is for video source apparatus 105 to pre-allocate the slot resource allocation list field 306 based on link quality measurement and multi-channel cross-slot allocation signaling to non-cross-slot resources, and video source apparatus 105 first completes video data transmission synchronization. The advantage of this method is that it significantly reduces the complexity of video source slot resource scheduling, thus significantly reducing the total latency and video source slot resource scheduling delay. By sending and synchronizing video resources, real-time collaborative display of video data is ensured. The disadvantage of this approach is that it requires pre-allocation of non-cross-time slot resources, which can reduce the resource utilization of video source apparatus 105, thereby reducing throughput. This method is mainly used for collaborative display of video data when video source apparatus 105 has high real-time transmission requirements.

Video source apparatus 105 selects the retransmission display correction strategy as an alternative strategy for retransmission and correction of video data. Therefore, when video source apparatus 105 allocates slot resources for sensor(s) 110 (210) and/or node(s) 115 (215) that need corrected or retransmitted video data, it can select from the following two methods according to one or more exemplary embodiments of the present disclosure.

A first method is for video source apparatus 105 to pre-allocate a large number of non-cross-slot and/or cross-slot resources based on link quality measurement and the slot resource allocation list field 306 of multi-channel cross-slot allocation signaling. At the same time, video source apparatus 105 first completes video data transmission synchronization. The advantage of this method is that it can complete the retransmission display of video data on the basis of low complexity resource scheduling and low latency. The disadvantage of this method is that it requires a large amount of pre-occupied time slot resources to complete the retransmission display of video data, thus significantly reducing the resource utilization of video source apparatus 105 and thereby reducing throughput. This method is mainly used when video source apparatus 105 has multiple retransmissions and a large amount of retransmitted video data.

A second method is for video source apparatus 105 to temporarily allocate non-cross-slot and/or cross-slot resources based on link quality measurement and the slot resource allocation list field 306 of multi-channel cross-slot allocation signaling for the transmission of retransmission displayed video data. When retransmission displayed video data is sent, video source apparatus 105 does not need to complete transmission synchronization. The advantage of this method is that when retransmitting display video data, the resource utilization is low, thereby improving throughput. At the same time, because there is no need to complete transmission synchronization in advance, the total latency and transmission synchronization delay can be reduced. The disadvantage of this method is that video source apparatus 105 requires complex time slot resource allocation and scheduling to complete temporary non-cross-time slots and/or cross-time slots. This method is mainly used when video source apparatus 105 has fewer retransmissions and a small amount of retransmitted video data.

Video source apparatus 105 selects the standard frame structure slot resource allocation strategy as the default slot resource allocation strategy, which strategy does not enable multi-channel cross-slot resource allocation.

Table 2 below summarizes the respective strategies that can be selected by video source apparatus 105 and indicated at cross-slot resource allocation strategy selection field 308.

TABLE 2

| Strategy type | Application scenario | Specific implementation details | Advantages/ Disadvantages |
|---|---|---|---|
| Real time display priority strategy | 1. Video data transmission with very low latency; and 2. Sensor(s) 110 (210) and/or node(s) 115 (215) that require real-time display require a very small real-time synchronization delay. | 1. When allocating slot resources, video source apparatus 105 needs to set link quality measurement and multi-channel cross-slot allocation signaling. In the slot resource allocation list field, prioritize selecting links with lower channel throughput and fewer link topology levels to send video data. 2. Prioritize resources that are not allocated across time slots to ensure that video source apparatus 105 schedules time slot resources with less latency, thereby ensuring video data transmission under very low round-trip latency in this strategy. 3. Use cross-slot resource allocation only when the performance parameters of sensor(s) 110 (210) and/or node(s) 115 (215) change, and video source apparatus 105 cannot schedule sufficient time slot resources on non-cross-slot allocated resources. 4. When selecting cross-slot resource allocation, prioritize selecting cross-slot resources at the same | Advantages: 1. Very low round-trip latency for data transmission. 2. Very low real-time synchronization latency for multiple nodes and/ or video terminals. Disadvantages: 1. It requires occupying a large amount of non-cross time slot resources. 2. Increased complexity in video source scheduling and allocation of cross-slot resources. |

TABLE 2-continued

| Strategy type | Application scenario | Specific implementation details | Advantages/ Disadvantages |
|---|---|---|---|
| | | channel and link topology level to ensure video data transmission under different latencies. | |
| Synchronous display priority policy | 1. Prioritize same round-trip latencies to ensure that video data is displayed in sync as much as possible and with minimal latency. 2. Display scenarios with high real-time performance and low latency for synchronous display. 3. Video source apparatus 105 with high requirements for synchronous display. | 1. When allocating time slot resources, video source apparatus 105 selects thesame channel and link topology level for sensor(s) 110 (210) and/or node(s) 115 (215) that need to be displayed synchronously based on the time slot resource allocation list field 306 of video source apparatus 105's link quality measurement and multi-channel cross time slot allocation signaling. 2. Set all application purposes to synchronous display. | Advantages: 1. Prioritizes sensor(s) 110 (210) and/or node(s) 115 (215) that require synchronous display having the same link quality. 2. Ensures that the latency during video data transmission and display is the same or similar. 3. Ensures to the greatest extent possible that sensor(s) 110 (210) and/or node(s) 115 (215) that require synchronous display under the synchronous display priority strategy achieve the best display effect with the lowest possible latency. Disadvantages: 1. When the throughput in video source apparatus 105 is high, video source apparatus 105 requires complex cross-slot resource allocation algorithms to select slot resources with the same or similar latency. 2. Can require the most non-cross-slot resources. 3. If cross-time slot resources are selected, video source apparatus 105 needs to first complete the |

TABLE 2-continued

| Strategy type | Application scenario | Specific implementation details | Advantages/ Disadvantages |
|---|---|---|---|
| | | | synchronization of non-cross-time slot resources and cross-time slot resources, and then send video data on both non-cross-time slot resources and cross-time slot resources, which potentially increases latency and may reduce the real-time effect of synchronization display. 4. On the basis of using the most non-cross-time slot resources and minimizing latency, complete synchronous display. |
| 1. Moderate synchronous display requirements. 2. Complete synchronous display while maintaining a compromise between slot resource allocation and total latency. | | 1. When allocating slot resources, video source apparatus 105 selects most sensor(s) 110 (210) and/or node(s) 115 (215) in the slot resource allocation list field 306 based on link quality measurement and multi-channel cross-slot allocation signaling, with the same channel and link topology hierarchy. The remaining sensor(s) 110 (210) and/ or node(s) 115 (215) to be synchronized for display are allocated to the slot resource allocation list field 306 for link quality measurement and multi-channel cross-slot allocation signaling to other channel and/or link topology levels. 2. When allocating resources across time slots, if the throughput of video source apparatus 105 is high, video source apparatus 105 can place most sensor(s) 110 (210) and/or node(s) 115 (215) located in the same channel and link topology level to be synchronized and displayed on the resources allocated across time slots. 3. Video source apparatus 105 can complete synchronization display without completing the synchronization of | Advantages: 1. It is possible to minimize the latency of sensor(s) 110 (210) and/or node(s) 115 (215) to be synchronized for display. 2. Simultaneously using non-cross-slot resources and cross-slot resources, effectively reducing the complexity of video source slot resource scheduling and allocation. 3. On the basis of ensuring the same or similar latency, reduce the latency value to a limited extent to reduce the latency difference with other sensor(s) 110 (210) and/or node(s) 115 (215) waiting on the remaining channel and/or link topology |
| | | | non-cross-slot resources and cross-slot resources. Therefore, video source apparatus 105 can ensure that the latency and total synchronization delay are minimized as much as possible. If the throughput of video source apparatus 105 is small, video source apparatus 105 can place most sensor(s) 110 (210) and/or node(s) 115 (215) located in the same channel and link topology hierarchy to be synchronized and displayed on resources that are not allocated across time slots. 4. After video source apparatus 105 completes strict synchronization of video data transmission, the video data is sent. | levels. Disadvantages: 1. Due to significant differences in link quality between sensor(s) 110 (210) and/or node(s) 115 (215) on the remaining channel and/ or link topology levels, there can be significant differences in latency, and video source apparatus 105 needs to first complete transmission synchronization before sending video data. |
| 1. Maintain synchronous display and continuously complete the transmission and display of synchronized video data. 2. Complete synchronized display while maintaining continuous synchronized display data. 3. Synchronous display retention strategy. | | 1. When allocating slot resources, video source apparatus 105 selects the sensor(s) 110 (210) and/or node(s) 115 (215) to be synchronized and displayed as their confirmed channels, link topology levels, and application purposes based on the slot resource allocation list field 306 of link quality measurement and multi-channel cross-slot allocation signaling. 2. Video source apparatus 105 dynamically allocates available time slot resources, including cross-time slot resources and non-cross-time slot resources, based on throughput. 3. After video source apparatus 105 completes strict synchronization of video data transmission, the video data is sent. | Advantages: 1. The allocation of time slot resources for video sources is the simplest, minimizing the complexity of cross-time slot resource allocation for video sources. 2. The optimal strategy for maintaining synchronized video data. Disadvantages: 1. Due to the large latency and the total delay of sending synchronization delay, the display effect of synchronization display can be poor. 2. Due to the significant difference in latency between sensor(s) 110 (210) and/or node(s) 115 (215) to be synchronized, video source |

TABLE 2-continued

| Strategy type | Application scenario | Specific implementation details | Advantages/ Disadvantages |
|---|---|---|---|
| Image retention display priority strategy | 1. Need to have the lowest possible refresh rate, i.e., frame rate, for video data display. 2. Ensure that the display of video data is completed and maintained as long as possible. 3. The video data has not changed for a long time. 4. Scenarios with low video data transmission volume when only local video data changes exist. 5. Scenarios with high requirements for image retention display, but low requirements for synchronous display of sensor(s) 110 (210) and/or node(s) 115 (215) waiting for image retention display. 6. Video source apparatus 105 with large amount of changing video data and a demand for synchronous display. 7. Video source apparatus 105 that requires both image maintenance and synchronous display. | 1. When allocating slot resources, video source apparatus 105 prioritizes allocating the slot resource allocation list field 306 of multi-channel cross-slot allocation signaling based on link quality measurement to the cross-slot allocated resources. 2. When there is a change in video data and the amount of changed video data is small, video source apparatus 105 temporarily allocates cross-time slot resources to meet the transmission needs of the changed video data. | apparatus 105 requires complex synchronization algorithms to complete transmission synchronization, which can significantly increase the delay of transmission synchronization. Advantages: 1. Due to low real-time display requirements, image retention display can be achieved without the need for a large number of non-cross-time slot resources and complex resource scheduling. 2. The requirement for latency is low, therefore, video source apparatus 105 does not need to complete transmission synchronization to meet the need for image retention display. Disadvantages: 1. If the image remains displayed for a short period of time or the amount of changing video data is large, the total delay of latency and transmission synchronization delay can significantly increase. 2. While ensuring the display quality of each node and/or video terminal to be displayed, it may not be possible to ensure the synchronization of all nodes and/or video terminal images to be displayed. |
|  |  | 1. Video source apparatus 105 prioritizes allocating the slot resource allocation list field 306 of multi-channel cross-slot allocation signaling based on link quality measurement to the resources allocated across time slots. 2. When there are changes in video data and the amount of changed video data is large, video source apparatus 105 pre-allocates resources across time slots and/or non-time slots for the transmission of changed video data. | Advantages: 1. Video source apparatus 105 has pre-allocated cross-slot and/or non-cross-slot resources for changing video data. 2. Video source apparatus 105 can complete the transmission and display of all changed video data within the shortest possible resource scheduling delay. 3. Significantly reduces the latency of sending changing video data, which can significantly reduce the synchronization delay of sensor(s) 110 (210) and/or node(s) 115 (215) waiting for image maintenance display. 4. On the basis of maintaining image display as much as possible, the synchronous display requirement is met. Disadvantages: 1. Due to the need for video sources to pre-allocate cross-slot and/or non-cross-slot resources for changing video data, the utilization rate of time slot resources can be reduced. |

TABLE 2-continued

| Strategy type | Application scenario | Specific implementation details | Advantages/ Disadvantages |
|---|---|---|---|
|  |  | 1. Video source apparatus 105 prioritizes allocating the slot resource allocation list field 306 of multi-channel cross-slot allocation signaling based on link quality measurement to non-cross-slot allocated resources. 2. Video source apparatus 105 pre-allocates non-cross-slot resources for the display of changing video data. 3. Video source apparatus 105 first completes the synchronization of video data transmission, and then maintains the display of video data. | Advantages: 1. On the basis of ensuring that all nodes and/or video terminal images to be displayed remain displayed, video source apparatus 105 reduces latency as much as possible by allocating non-cross-slot resources and sending synchronization. 2. Ensures meeting the synchronous display requirements of sensor(s) 110 (210) and/or node(s) 115 (215) that are waiting for images to be displayed. Disadvantages: 1. It requires occupying a large amount of non-cross-time slot resources. 2. Significantly increasing the complexity of video source resource scheduling. 3. High resource utilization rate. 4. It can reduce throughput. |
| Collaborative Display Optimization Strategy | 1. It is necessary to provide low latency video data synchronization and transmission for some sensor(s) 110 (210) and/or node(s) 115 (215) with short-term performance parameter changes. 2. Video source apparatus 105 with a small amount of collaborative display video data. 3. Video source apparatus 105 with high requirements for real-time transmission of collaborative display video data. | 1. Video source apparatus 105 temporarily allocates the slot resource allocation list field 306 based on link quality measurement and multi-channel cross-slot allocation signaling to non-cross-slot resources. 2. Video source apparatus 105 first completes the synchronization of video data transmission, and then sends the video data. | Advantages: 1. A foundation that occupies as little time slot resources as possible. 2. Synchronize the transmission of collaborative display video data as much as possible. Disadvantages: 1. Video source apparatus 105 needs to temporarily allocate time slot resources for collaborative display of video data. 2. It can increase the complexity of resource scheduling. 3. It is necessary to first complete the sending of synchronization before sending data. 4. Added latency. |
|  |  | 1. Video source apparatus 105 pre-allocates the slot resource allocation list field 306 of multi-channel cross-slot allocation signaling based on link quality measurement to non-cross-slot resources. 2. Video source apparatus 105 first completes the synchronization of video data transmission, and then sends the video data. | Advantages: 1. Significantly reducing the complexity of video source slot resource scheduling. 2. Significantly reducing the total latency of latency and video source timeslot resource scheduling latency; 3. By sending and synchronizing video resources, real-time collaborative display of video data is ensured. Disadvantages: 1. Non-cross-slot resources need to be pre-allocated. 2. It can reduce the resource utilization of video source apparatus 105. 3. Reduce throughput. |
| Retransmission display correction strategy | 1. Alternative strategies. 2. Used for retransmission and correction of video data in video source apparatus 105. | 1. Video source apparatus 105 pre-allocates a large number of non-cross-slot and/or cross-slot resources based on link quality measurement and the slot resource allocation list field 306 of multi-channel cross-slot allocation signaling. 2. Video source apparatus 105 first completes the synchronization of video data transmission, and then sends the video data. | Advantages: 1. Low complexity resource scheduling and low latency. 2. Complete the retransmission display of video data. 3. Video data transmission with multiple retransmissions and a large amount of retransmitted video data. |

TABLE 2-continued

| Strategy type | Application scenario | Specific implementation details | Advantages/ Disadvantages |
|---|---|---|---|
| | | 1. Video source apparatus 105 temporarily allocates non-cross-slot and/or cross-slot resources based on link quality measurement and the slot resource allocation list field 306 of multi-channel cross-slot allocation signaling for retransmission of displayed video data. | Disadvantages: 1. It is necessary to occupy a large amount of time slot resources in advance to complete the retransmission and display of video data. 2. Significantly reducing the resource utilization of video source apparatus 105. 3. Reduced throughput. Advantages: 1. When retransmitting display video data, video source apparatus 105 does not need to complete transmission synchronization. 2. Low resource utilization during retransmission of video data, thereby improving throughput. 3. Reduced the total latency and transmission synchronization delay. Disadvantages: 1. Video source apparatus 105 requires complex time slot resource allocation and scheduling to complete temporary non-cross-time slots and/or cross-time slots. 2. It can only be used for sending video data with few retransmissions and a small amount of retransmitted video data. |
| Standard Frame Structure Time Slot Resource Allocation Strategy | 1. Default slot resource allocation strategy for Video source apparatus 2. Time slot resource allocation strategy when video source apparatus 105 is not enabled for multi-channel cross-time slot resource allocation. | Standard default implementation plan | Advantages: 1. Standard default strategy with maximum compatibility. Disadvantages: 1. Does not support diversity allocation of time slot resources. |

Figure 5A:
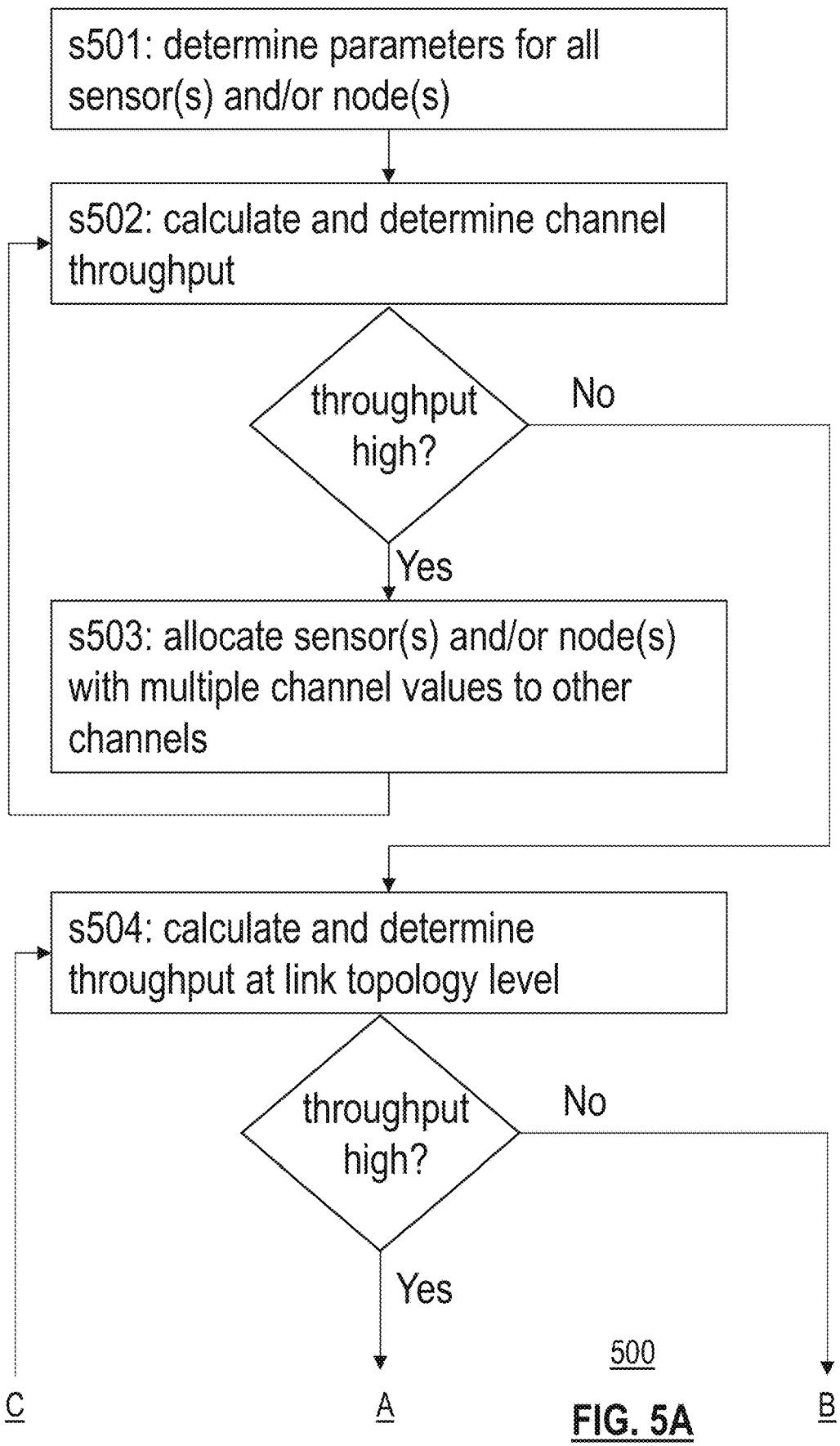
FIG. 5A is a first portion of a flow diagram of a process for cross-slot resource scheduling and allocation based on link quality measurement and multi-channel cross-slot allocation signaling according to one or more example implementations of the present disclosure.
Figure 5B:
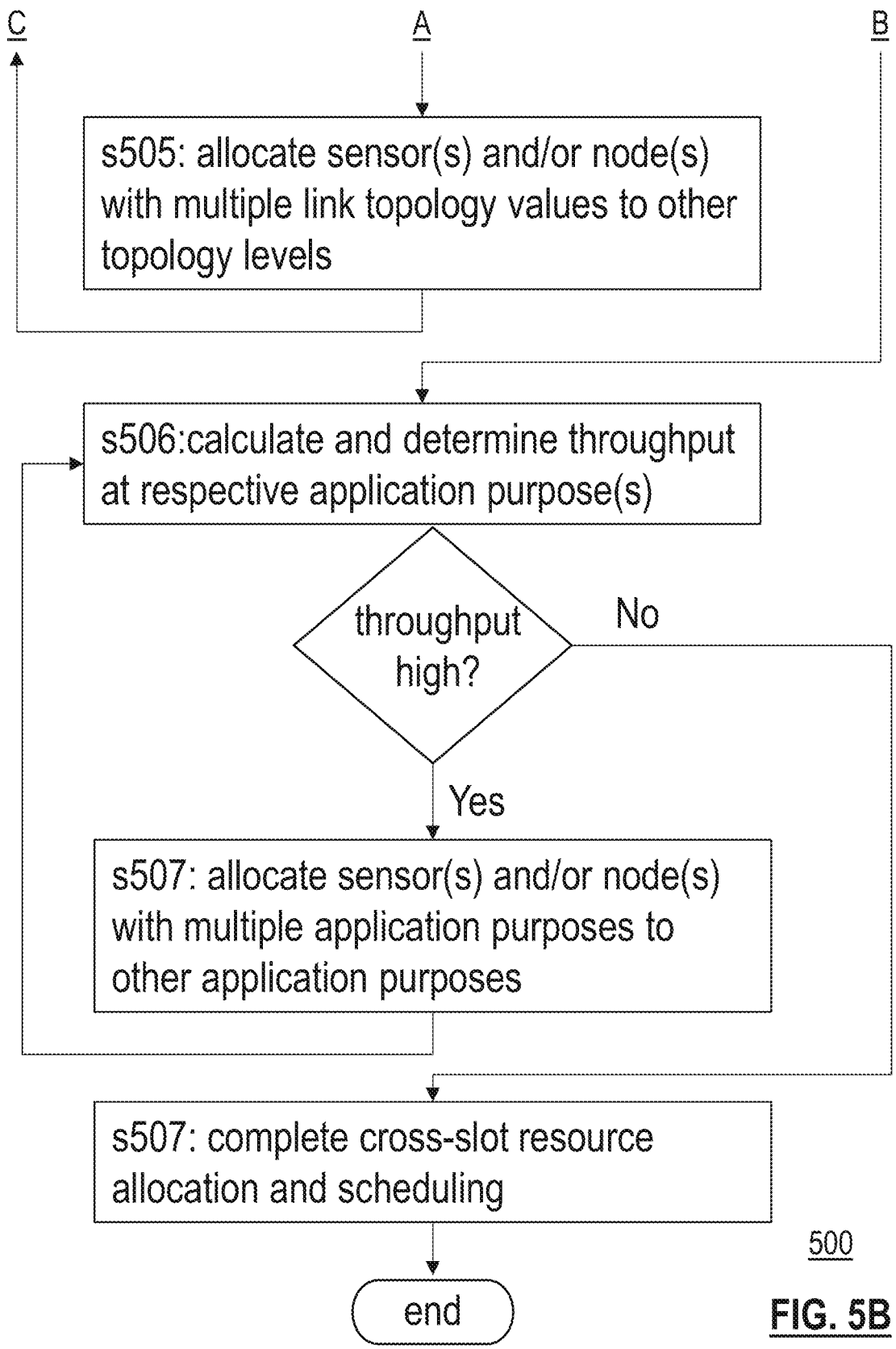
FIG. 5B is a second portion of a flow diagram of a process for cross-slot resource scheduling and allocation based on link quality measurement and multi-channel cross-slot allocation signaling according to one or more example implementations of the present disclosure.

FIGS. 5A and 5B together form a flow diagram of a process 500 for cross-slot resource scheduling and allocation based on link quality measurement and multi-channel cross-slot allocation signaling according to one or more example implementations of the present disclosure.

As illustrated in FIGS. 5A and 5B, process 500 includes the following steps s501-s508.

Step s501: video source apparatus 105 reads the slot resource allocation list field 306 for link quality measurement and multi-channel cross-slot allocation signaling, and determines the channels (402), link topology levels (404), and application purposes (406) of all sensor(s) 110 (210) and/or node(s) 115 (215).

Step s502: video source apparatus 105 calculates and determines a real-time channel throughput. If the throughput is high ("Yes"), video source apparatus 105 proceeds to step s503; otherwise ("No"), video source apparatus 105 proceeds to step s504.

Step s503: Video source apparatus 105 allocates sensor(s) 110 (210) and/or node(s) 115 (215) with multiple channel values in the slot resource allocation list field 306 of link quality measurement and multi-channel cross-slot allocation signaling to other channels and returns to step s502.

Step s504: video source apparatus 105 calculates and determines the real-time throughput at a link topology level. If the throughput is high ("Yes"), video source apparatus 105 proceeds to step s505; otherwise ("No"), video source apparatus 105 proceeds to step s506.

Step s505: video source apparatus 105 allocates sensor(s) 110 (210) and/or node(s) 115 (215) with multiple link topology level values in the slot resource allocation list field 306 of link quality measurement and multi-channel cross-slot allocation signaling to other link topology levels and returns to step s504.

Step s506: video source apparatus 105 calculates and determines the real-time throughput for different application purposes. If the throughput is high ("Yes"), video source apparatus 105 proceeds to step s507; otherwise ("No"), video source apparatus 105 proceeds to step s508.

Step s507: video source apparatus 105 allocates sensor(s) 110 (210) and/or node(s) 115 (215) with multiple application purposes on the slot resource allocation list field 306 of link quality measurement and multi-channel cross-slot allocation signaling to other application purposes and returns to step s506.

Step s508: video source apparatus 105 completes the allocation and scheduling of cross-slot resources and process 500 ends.

In certain embodiments, at step s502, video source apparatus 105 calculates and determines a real-time channel throughput, which can include, but not limited to:
  a. determining the total number of sensor(s) 110 (210) and/or node(s) 115 (215) on all channels and if it exceeds a pre-set threshold, it indicates a high throughput on a channel, otherwise, it indicates a low throughput, the pre-set threshold can be a proportion of the number of sensor(s) 110 (210) and/or node(s) 115 (215) on the channel to the total number of sensor(s) 110 (210) and/or node(s) 115 (215) communicatively connected to video source apparatus 105; and
  b. determining the performance parameters of all sensor(s) 110 (210) and/or node(s) 115 (215) on a channel, such as resolution, BPC, frame rate, to name a few, and if it needs to meet a large number of displays with different resolutions, high BPC values (such as 12 bits, 16 bits, or the like), and high frame rates (such as 120 kHz, 144 kHz, or the like), then it indicates that the throughput on the channel is high; otherwise, it indicates that the throughput is low.

In certain embodiments, at step s504, video source apparatus 105 calculates and determines the real-time throughput of a link topology level, which can include, but not limited to:
  a. Determining the total number of sensor(s) 110 (210) and/or node(s) 115 (215) at all link topology levels and if a pre-set threshold is exceeded, it indicates a high throughput on the link topology level, otherwise, it indicates a low throughput, the pre-set threshold can be a proportion of the number of sensor(s) 110 (210) and/or node(s) 115 (215) at the link topology level to the total number of sensor(s) 110 (210) and/or node(s) 115 (215) communicatively connected to video source apparatus 105;
  b. determining the performance parameters of all sensor(s) 110 (210) and/or node(s) 115 (215) at a link topology level, such as resolution, BPC, frame rate, to name a few, and if it needs to meet a large number of displays with different resolutions, high BPC values (such as 12 bits, 16 bits, or the like), and high frame rates (such as 120 kHz, 144 kHz, or the like), it indicates that the throughput at the link topology level is high; otherwise, it indicates that the throughput is low.

When video source apparatus 105 calculates and determines the real-time throughput of a link topology level at step s504, it can select sensor(s) 110 (210) and/or node(s) 115 (215) at the link topology level on all channels. Accordingly, video source apparatus 105 can dynamically adjust the sensor(s) 110 (210) and/or node(s) 115 (215) at the link topology level on all channels, which is suitable for the requirements when establishing the link topology level on all channels. In certain embodiments, video source apparatus 105 can also select sensor(s) 110 (210) and/or node(s) 115 (215) at the link topology level on a single channel, which is applicable to all channels where the link topology level has been established. Video source apparatus 105 can adjust the throughput of temporary changes in the link topology level in real time, such as throughput changes caused by changes in performance parameters of a few sensor(s) 110 (210) and/or node(s) 115 (215) at the link topology level.

In one or more exemplary implementations, video source apparatus 105 pre-allocates different time slot resource intervals based on time slot resource channels, link topology levels, performance parameters, and application purposes. Each resource interval sets a resource interval link quality measurement header 304, with the following two objectives.

One objective is that during link quality measurement, video source apparatus 105 sends link quality measurement and multi-channel cross-slot allocation signaling using the time slot resources of a set resource interval. At the same time, sensor(s) 110 (210) and/or node(s) 115 (215) continuously receive different link quality measurements and multi-channel cross-slot allocation signaling on the resource interval. If sensor(s) 110 (210) and/or node(s) 115 (215) can correctly demodulate the link quality measurement header 304 in the resource interval, video source apparatus 105 allocates video data transmission resources for sensor(s) 110 (210) and/or node(s) 115 (215) in the resource interval where the link quality measurement header 304 belongs. If sensor(s) 110 (210) and/or node(s) 115 (215) can correctly receive multiple link quality measurement headers 304 in the set resource interval, video source apparatus 105 allocates cross-slot resources for sensor(s) 110 (210) and/or node(s) 115 (215) for different needs of channel/link topology hierarchy/performance parameters/application purposes, such as, collaboration, error correction/retransmission, performance parameter changes, or the like.

A second objective is that video source apparatus 105 can allocate video data transmission resources for sensor(s) 110 (210) and/or node(s) 115 (215) within a set resource interval determined by the correctly received link quality measurement header 304. Thus, video source apparatus 105 can choose to search and use/not search for resources across time slot intervals for video data transmission.

In certain embodiments, when measuring link quality, it is possible to group and send link quality measurements and multi-channel cross-slot allocation signaling based on channel/link topology hierarchy/performance parameters/application purposes. Video source apparatus 105 allocates different time slot resources based on channel/link topology hierarchy/performance parameters/application purposes to send specific link quality measurement sequences. A sensor(s) 110 (210) and/or node(s) 115 (215) receives link quality measurement and multi-channel cross-slot allocation signaling. If correctly received, then the sensor(s) 110 (210) and/or node(s) 115 (215) modifies the channel indicator byte 402, link topology level indicator byte 404, and application purpose indicator byte 406 in the slot resource allocation list field 306 of the video source setting of the link quality measurement and multi-channel cross-slot allocation signaling, corrects the setting of multi-channel slot resource allocation registers for its own sensor(s) 110 (210) and/or node(s) 115 (215), and records all possible channel, link topology levels, and application purposes. When a sensor(s) 110 (210) and/or node(s) 115 (215) can correctly receive multiple link quality measurements and link quality measurement sequences in multi-channel cross-slot allocation signaling simultaneously, it can also modify the channel indicator bytes 402, link topology level indicator bytes 404, and application purpose indicator bytes 406 in the slot resource allocation list fields 306 of link quality measurements and multi-channel cross-slot allocation signaling in the video source settings of the sensor(s) 110 (210) and/or node(s) 115 (215), correct the setting of multi-channel slot resource allocation registers for its own sensor(s) 110 (210)

and/or node(s) 115 (215), and record all possible channel, link topology levels, and application purposes.

Figure 6:
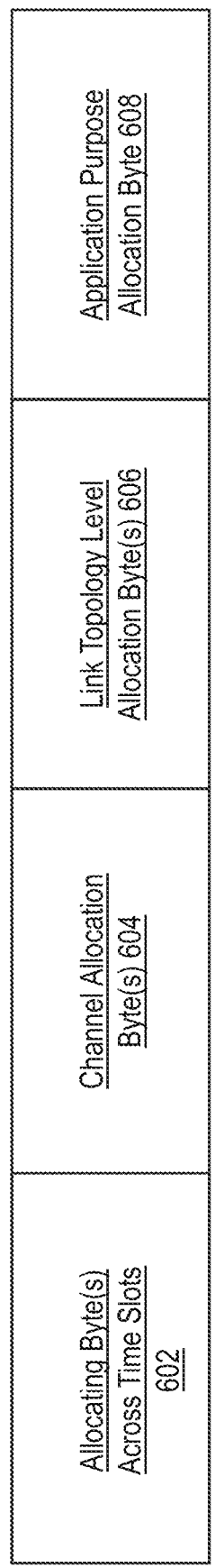
FIG. 6 is a schematic diagram depicting a multi-channel slot resource allocation register according to one or more exemplary implementations of the present disclosure.

FIG. 6 is a schematic diagram depicting a multi-channel slot resource allocation register 600 for setting sensor(s) 110 (210) and/or node(s) 115 (215) according to one or more exemplary implementations of the present disclosure.

As illustrated in FIG. 6, register 600 includes allocating byte(s) across time slots 602 for specifying, by sensor(s) 110 (210) and/or node(s) 115 (215), a number of resource intervals that the sensor(s) 110 (210) and/or node(s) 115 (215) are capable of using. According to one or more exemplary implementations, when one or more sensor(s) 110 (210) and/or node(s) 115 (215) receive video data, the sensor(s) 110 (210) and/or node(s) 115 (215) only selects the portion specified by byte(s) 602 to reduce the time for searching and using cross-time slot resource intervals.

Sensor(s) 110 (210) and/or node(s) 115 (215) specifies one or more usable channels at channel allocation byte(s) 604. Thus, during a link quality measurement phase, sensor(s) 110 (210) and/or node(s) 115 (215) specifies a current channel and, during a video data reception phase, sensor(s) 110 (210) and/or node(s) 115 (215) corrects based on one or more channels determined by video source apparatus 105.

Sensor(s) 110 (210) and/or node(s) 115 (215) determines and specifies one or more usable link topology levels at link topology level allocation byte(s) 606. When in a link quality measurement stage, sensor(s) 110 (210) and/or node(s) 115 (215) specifies a current level and, when in a video data receiving stage, sensor(s) 110 (210) and/or node(s) 115 (215) corrects based on one or more link topology levels determined by video source apparatus 105.

Sensor(s) 110 (210) and/or node(s) 115 (215) determines and specifies one or more usable application purposes at application purpose allocation byte(s) 608. When in a link quality measurement stage, sensor(s) 110 (210) and/or node(s) 115 (215) specifies a current application purpose and, when in a video data receiving stage, sensor(s) 110 (210) and/or node(s) 115 (215) corrects based on one or more application purposes determined by video source apparatus 105.

According to one or more example implementations, the communication protocol used by video source apparatus 105 for communicating and/or transporting video content among sensors 110 (and 210) and nodes/terminals 115 (and 215) is based on one or more augmentations and/or modifications to a standard frame pursuant to one or more video display and interface standards, such as VESA, DisplayPort, MIPI, HDMI, to name a few.

Figure 7:
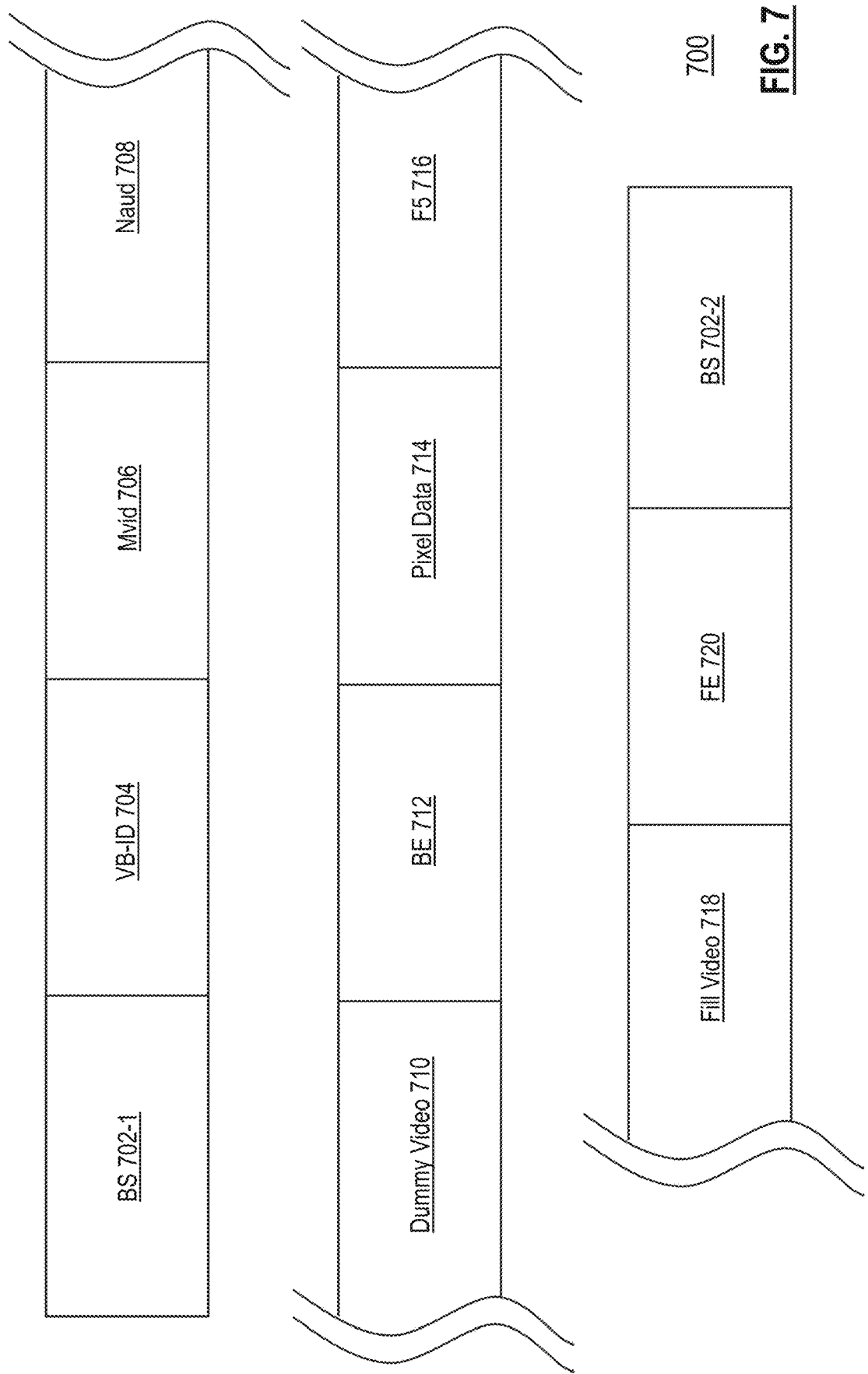
FIG. 7 illustrates a standard frame structure on which augmentations or modifications are adapted for a communication protocol according to one or more exemplary implementations of the present disclosure.

FIG. 7 illustrates a standard frame structure 700 on which augmentations and/or modifications are adapted for the link quality measurement communication protocol according to one or more exemplary implementations of the present disclosure.

As illustrated in FIG. 7, a standard frame 700 includes the following fields: a blanking start (BS) field 702-1, a vertical blanking identifier (VB-ID) 704, a timer value (Mvid) 306 for the video data of frame 700, a timer value (Naud) 708 for the audio data of frame 700, a "dummy video" field 710 for pseudo data filling, a blanking end (BE) field 712, a "pixel data" field 714 for sending the video data of frame 700, a fill start (FS) field 716, a "fill video" field 718 for filling data when the pixel data is insufficient, and fill end (FE) field 720, which borders a BS field 702-2 of a next frame, as illustrated in FIG. 7.

According to one or more exemplary implementations of the present disclosure, video source apparatus 105 communicates with one or more of the other elements of system 100 using a modified link quality measurement and data transmission frame structure based on the standard frame structure, which modified frame structure accounts for multi-channel cross-slot resource allocation.

To accommodate the multi-channel cross-slot resource allocation, one or more of resource interval link quality measurement header field 304 and slot resource allocation list field 306, including channel indication byte(s) 402, link topology level indication byte(s) 404, and application purpose indication byte(s) 406 described above with reference to FIG. 4, can be incorporated in one or more time slots in a modification of the standard frame 700.

In certain embodiments, after the link quality measurement and multi-channel cross-slot allocation are completed, video source apparatus 105 can choose to cancel such one or more time slots from the modified multi-channel cross-slot resource allocation frame structure to reduce signaling overhead and improve slot resource utilization.

FIGS. 8A and 8B together form a schematic diagram depicting a modified frame structure 800 for a link quality measurement communication protocol according to one or more exemplary implementations of the present disclosure.

As illustrated in FIGS. 8A and 8B, the following time slots are added to a standard frame 700: link quality measurement enable time slot 802, resource interval link quality measurement header time slot 804, time slot resource allocation list time slot 806, cross-slot resource allocation strategy selection time slot 808, and link quality measurement feedback time slot 808.

Link quality measurement enable field 302 described above with reference to FIG. 3 is incorporated in a link quality measurement enable time slot 802 between BS 702 and VB-ID 704. Time slot 802 provides for enabling/disabling link quality measurement and multi-channel cross-slot allocation signaling. When enabled, resource intervals set resource interval link quality measurement header time slots 804 to identify different resource intervals. When disabled, resource interval link quality measurement header time slots 804 are disabled between resource intervals to reduce signaling overhead and improve slot resource utilization.

Additionally, in certain embodiments, after link quality measurement and multi-channel cross-slot allocation are completed, video source apparatus 105 can choose to cancel this slot 802 from the modified multi-channel cross-slot resource allocation frame structure 800 to reduce signaling overhead and improve slot resource utilization.

Resource interval link quality measurement header field 304 described above with reference to FIG. 3 is incorporated in a resource interval link quality measurement header time slot 804 between VB-ID 704 and Mvid 706. As described above with respect to time slot 802, time slot 804 is used to mark different resource intervals. When time slot 802 is enabled for link quality measurement, the resource interval link quality measurement time slot 804 is enabled. Otherwise, the resource interval link quality measurement header time slot 304 is disabled. In certain embodiments, time slot 304 also contains specific link quality measurement sequences to adapt to different link quality measurement requirements. In correspondence with resource interval link quality measurement header field 304, time slot 804 includes the following bytes: channel indication byte 402, link topology level indication byte 404, and application purpose indication byte 406.

A time slot resource allocation list time slot 806, which corresponds to slot resource allocation list field 306 described above with reference to FIG. 3, is incorporated between Mvid 706 and Naud 708 for video source apparatus 105 to allocate all time slot resources in advance according to an indication of link quality measurement header field 304/804 in the resource interval, and for resource allocation under channel/link topology level/performance parameters/application purposes.

Cross-slot resource allocation strategy selection field 308 described above with reference to FIG. 3 is incorporated in a cross-slot resource allocation strategy selection time slot 808 between Naud 708 and "dummy video" 710 for video source apparatus 105 to select pre-set cross-slot resource allocation strategies based on link quality measurement and multi-channel cross-slot allocation signaling in cross-slot resource allocation list field 306/806, and apply them to different channels, link topology layer levels, and application purposes.

A link quality measurement feedback time slot 810, which corresponds to link quality measurement feedback field 310 described above with reference to FIG. 3, is incorporated between "dummy video" 710 and BE 712 for signaling and state interaction between video source apparatus 105 and sensor(s) 110 (210) and/or node(s) 115 (215) in the link quality measurement protocol.

A revised video data transmission time slot 812 is incorporated between BE 172 and F5 716 for transporting video data among video source apparatus 105, sensor(s) 110 (210), and/or node(s) 115 (215).

Figure 9:
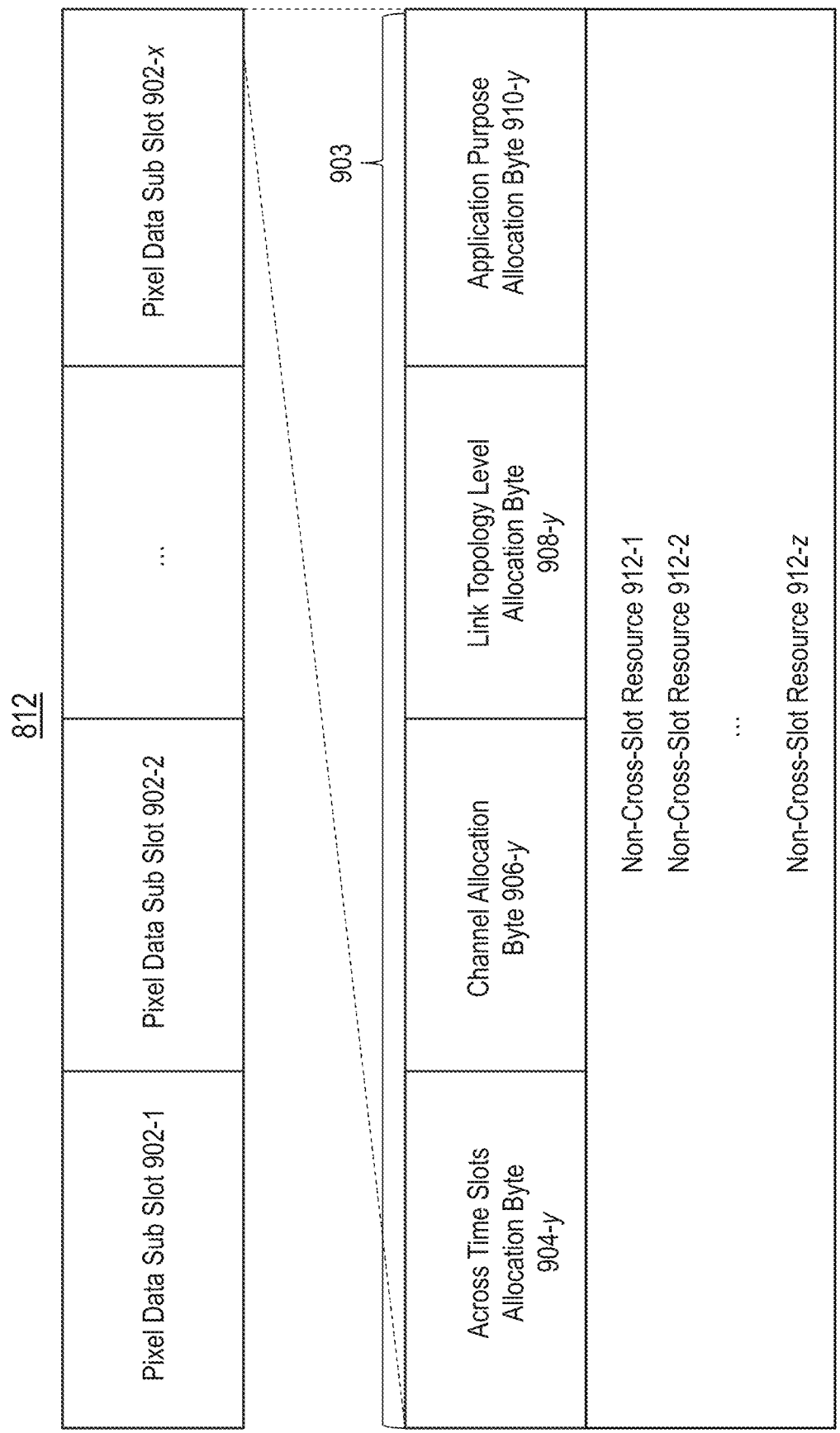
FIG. 9 is a diagram depicting a revised video data transmission time slot of FIG. 8B according to one or more example implementations of the present disclosure.
Figure 10A:
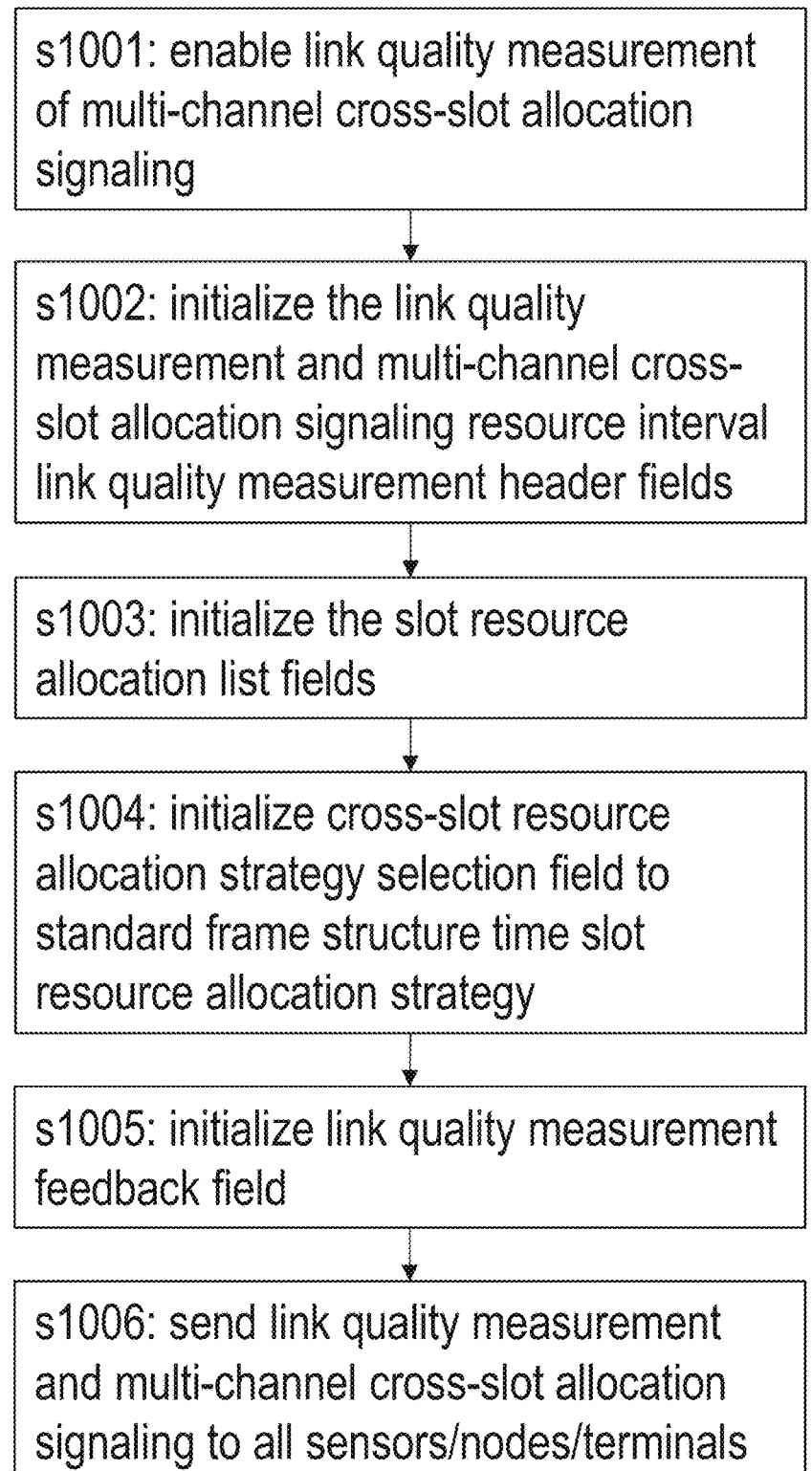
FIG. 10A is a first portion of a flow diagram of a link quality measurement and data transmission process for multi-channel cross-time slot resource allocation according to one or more exemplary implementations of the present disclosure.
Figure 10B:
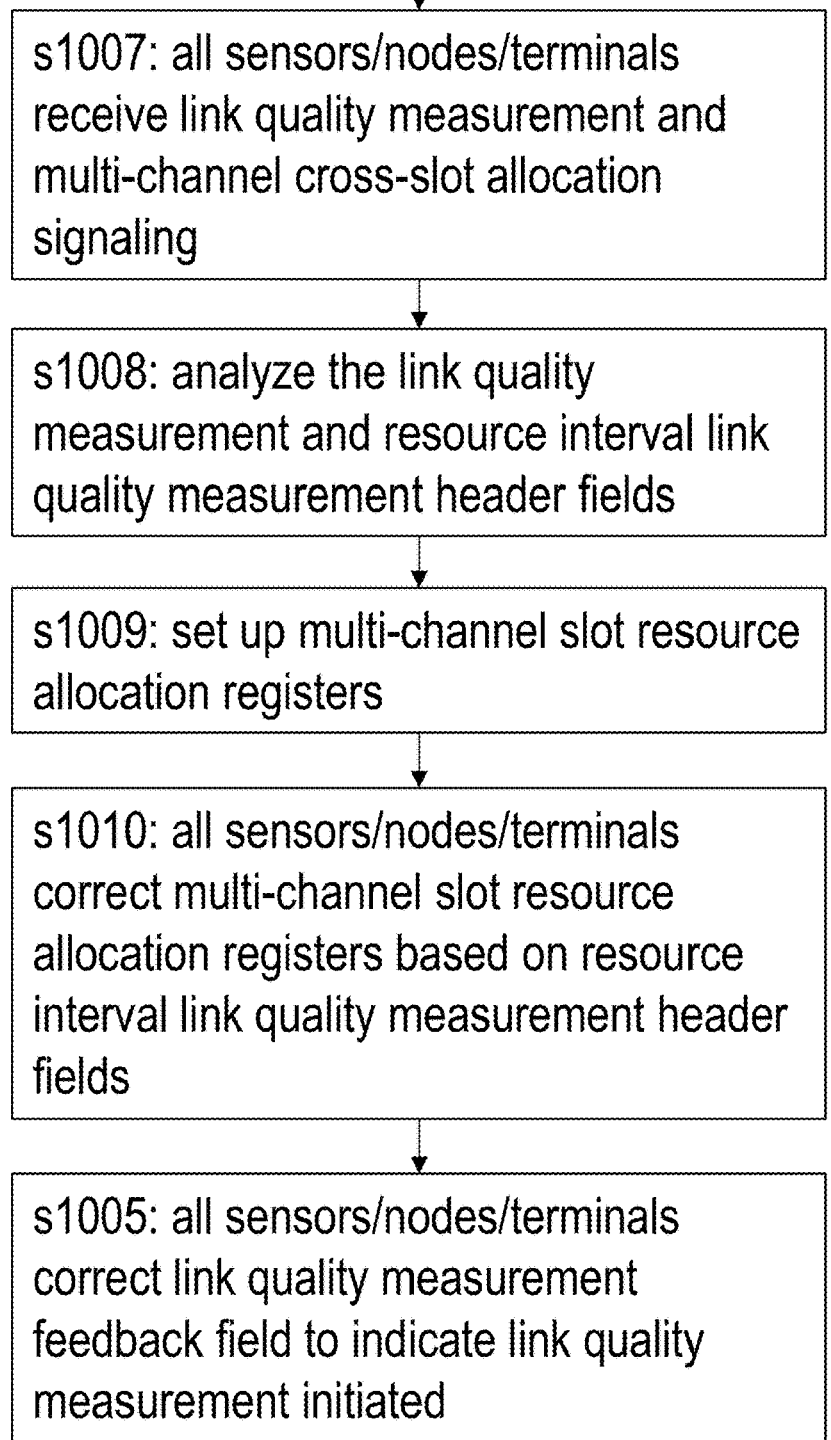
FIG. 10B is a second portion of the flow diagram continuing from FIG. 10A.
Figure 10C:
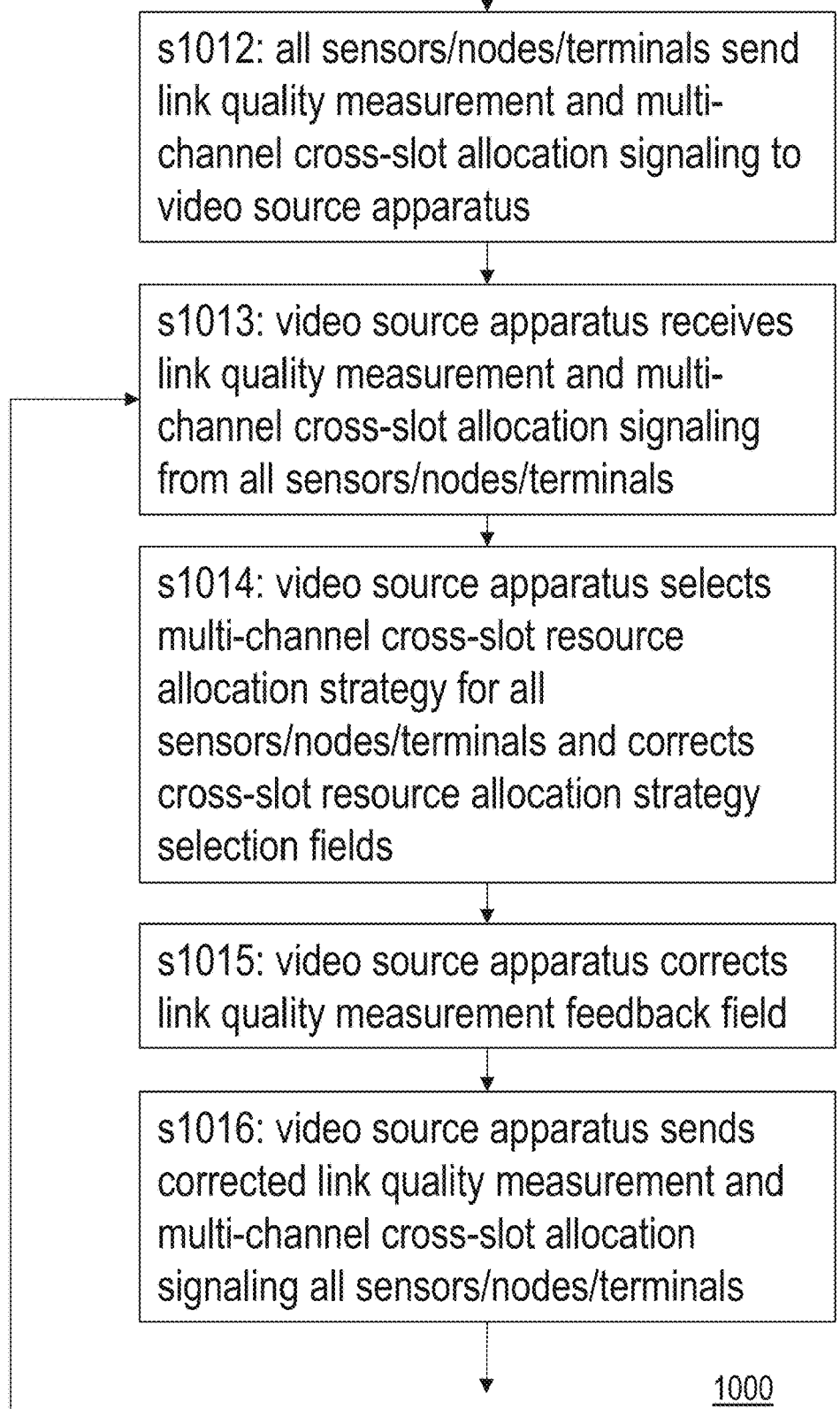
FIG. 10C is a third portion of the flow diagram continuing from FIG. 10B.
Figure 10G:
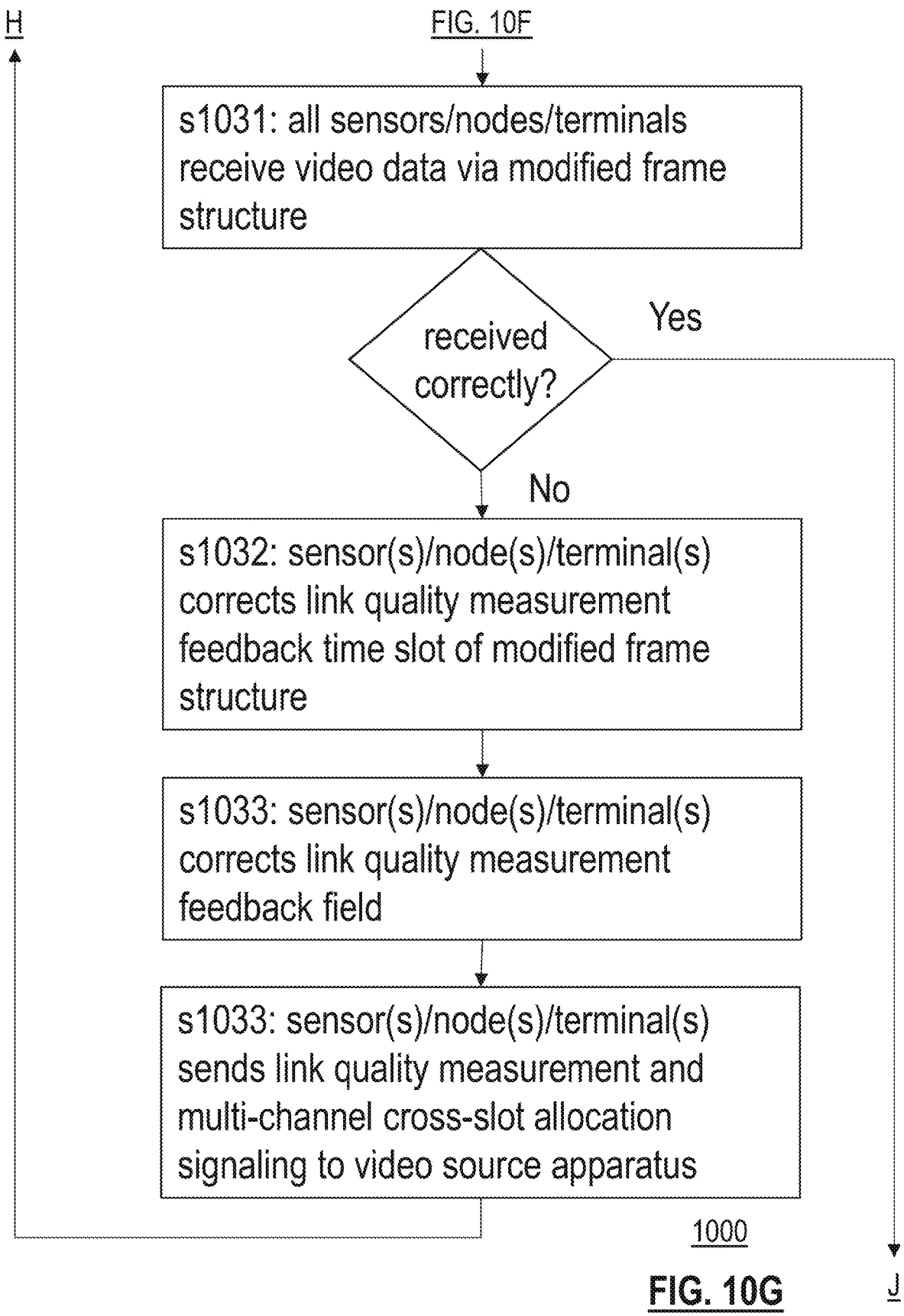
FIG. 10G is a seventh portion of the flow diagram continuing from FIG. 10F.
Figure 10J:
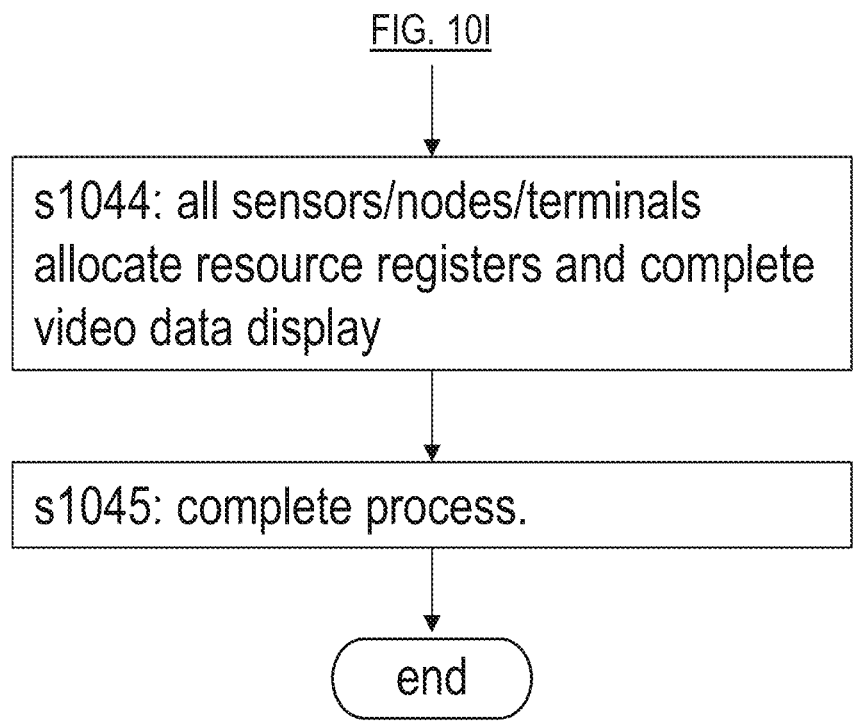
FIG. 10J is a tenth and final portion of the flow diagram continuing from FIG. 10I.

FIG. 9 is a schematic diagram depicting a revised video data transmission time slot 812 illustrated in FIG. 8B according to one or more example implementations of the present disclosure.

As shown in FIG. 9, revised (or corrected) pixel data time slots 812 includes first dividing pixel data time slots 812 into pixel data sub time slots 902, then dividing each pixel data sub time slot 902 into non-cross-time slot allocation time slots 903, and adding cross-time slot allocation bytes 904, channel allocation bytes 906, link topology level allocation bytes 908, and application purpose allocation bytes 910 on all non-cross-time slot allocation time slots 903 to identify all non-cross-time slots 903.

When the non-cross-slot allocation bytes 904, channel allocation bytes 906, link topology level allocation bytes 908, and application purpose allocation bytes 910 on each pixel data sub slot 902 are all the same, the pixel data time slot 812 is converted into a standard frame structure pixel time slot 700, and video source apparatus 105 allocates resources based on non-cross-slot resources 912.

When there are differences in cross-slot allocation bytes 904, channel allocation bytes 906, link topology level allocation bytes 908, and application purpose allocation bytes 910 for non-cross-slot allocation timeslots 903 on any pixel data sub timeslot 902, the pixel data timeslot 812 operates as part of a modified multi-channel cross-slot resource allocation video data communication frame 800. Video source apparatus 105 uses multi-channel cross-slot resource allocation and scheduling strategies to complete cross-slot resource allocation for all sensor(s) 110 (210) and/or node(s) 115 (215) at all link topology levels on the multi-channel.

As illustrated in FIG. 9, x represents a total number of pixel data sub time slots 902 that video source apparatus 105 has modified pixel data time slot 714 by dividing time slot 714 into pixel data sub slots 902-1, 902-2, . . . , 902-x.

FIG. 9 depicts details of Pixel data sub slot 902-x, which can be representative of pixel data sub slots 902.

As illustrated in FIG. 9, y represents a total number of resource interval link quality measurement header time slots 903 that video source apparatus 105 divides into each pixel data sub time slot 902. In certain embodiments, bytes 906, 908, and 910 respectively correspond to byte(s) 402, 404, and 406 described above with reference to FIG. 4.

When the total number x of sub time slots 902 in pixel data is equal to the total number y of time slots 903 in the link quality measurement header 304 of the resource interval, it indicates that all pixel time slot resources are allocated as non-cross-time slot resources.

When the total number x of sub time slots 902 in pixel data is not equal to the total number y of time slots 903 in the resource interval link quality measurement header 304, it indicates that some of the total pixel time slot resources are allocated for non-cross-time slot resources, while the other part is allocated for cross-time slot resources.

As shown in FIG. 9, z represents a total number of actual slot resources allocated by video source apparatus 105 to each resource interval link quality measurement header slot 304.

FIGS. 10A-10J together form a flow diagram depicting a link quality measurement and data transmission process 1000 for multi-channel cross time slot resource allocation in a video image processing system, such as video source apparatus 105, according to one or more exemplary implementations of the present disclosure.

As illustrated in FIGS. 10A-10J, process 1000 includes the following steps s1001-1046.

Step s1001: Video source apparatus 105 initializes the link quality measurement and enables the link quality measurement of multi-channel cross-slot allocation signaling. The enable field 302/802 is enabled, and multi-channel cross-slot resource allocation frame structure 800 is enabled by default.

Step s1002: Video source apparatus 105 initializes the link quality measurement and multi-channel cross-slot allocation signaling resource interval link quality measurement header fields 304/804 and determines the specific link quality measurement sequence corresponding to the header.

Step s1003: Initialize the slot resource allocation list fields 306/806 for link quality measurement and multi-channel cross-slot allocation signaling of video source apparatus 105, clear all slot resource allocation list fields, and make the list empty.

Step s1004: Video source initialization of link quality measurement and multi-channel cross-slot allocation signaling and cross-slot resource allocation strategy selection field 308/808 to a standard (or default) frame structure (700) time slot resource allocation strategy.

Step s1005: Video source initialization of link quality measurement and multi-channel cross-slot allocation signaling and link quality measurement feedback field 310/810, indicating that link quality measurement has been initiated and waiting for feedback.

Step s1006: Video source apparatus 105 sends link quality measurement and multi-channel cross-slot allocation signaling to all sensor(s) 110 (210) and/or node(s) 115 (215) on all link topologies on all channels.

Step s1007: All sensor(s) 110 (210) and/or node(s) 115 (215) on all link topologies on all channels receive video source link quality measurement and multi-channel cross-slot allocation signaling.

Step s1008: Analyze the link quality measurement and resource interval link quality measurement header fields 404/804 for multi-channel cross-slot allocation signaling for all sensor(s) 110 (210) and/or node(s) 115 (215) on all link topologies on all channels.

Step s1009: Set up multi-channel slot resource allocation registers 600 for all sensor(s) 110 (210) and/or node(s) 115 (215) on all link topologies on all channels, including: cross-slot allocation bytes 602, channel allocation bytes 604, link topology level allocation bytes 606, and application purpose allocation bytes 608.

Step s1010: All sensor(s) 110 (210) and/or node(s) 115 (215) on all link topologies on all channels correct the multi-channel slot resource allocation register 600 based on the channel 402, link topology level 404, and application purpose 406 marked in the link quality measurement header field 404/804 of the resource interval that can be correctly received, including: cross-slot allocation bytes 602, channel allocation bytes 604, link topology level allocation bytes 606, and application purpose allocation bytes 608.

Step s1011: All sensor(s) 110 (210) and/or node(s) 115 (215) on all link topologies on all channels correct the link quality measurement feedback field 310/810 for multi-channel cross-slot allocation signaling, indicating that the link quality measurement has been initiated and feedback has been provided.

Step s1012: All sensor(s) 110 (210) and/or node(s) 115 (215) on all link topologies on all channels send link quality measurement and multi-channel cross-slot allocation signaling to video source apparatus 105.

Step s1013: Video source apparatus 105 receives link quality measurements and multi-channel cross-slot allocation signaling from all nodes on all link topologies on all channels and/or video terminals.

Step s1014: Video source apparatus 105 selects a multi-channel cross-slot resource allocation strategy for all sensor(s) 110 (210) and/or node(s) 115 (215) on all link topologies on all channels, and corrects the cross-slot resource allocation strategy selection fields 308/808 for video source apparatus 105 initialization link quality measurement and multi-channel cross-slot allocation signaling.

Step s1015: Video source apparatus 105 corrects link quality measurement and multi-channel cross-slot allocation signaling link quality measurement feedback field 310/810, indicating that cross-slot resources have been allocated and waiting for feedback.

Step s1016: Video source apparatus 105 sends corrected link quality measurement and multi-channel cross-slot allocation signaling to all sensor(s) 110 (210) and/or node(s) 115 (215) on all link topologies on all channels.

Step s1017: All sensor(s) 110 (210) and/or node(s) 115 (215) on all link topologies on all channels receive corrected video source initialization link quality measurement and multi-channel cross-slot allocation signaling.

Step s1018: All sensor(s) 110 (210) and/or node(s) 115 (215) on all link topologies on all channels analyze the slot resource allocation list field 306/806 and cross-slot resource allocation strategy selection field 308/808 for link quality measurement and multi-channel cross-slot allocation signaling.

Step s1019: All sensor(s) 110 (210) and/or node(s) 115 (215) on all link topologies on all channels confirm their multi-channel slot resource allocation registers 600, including: cross-slot allocation bytes 602, channel allocation bytes 604, link topology level allocation bytes 606, and application purpose allocation bytes 608. If the slot resource allocation list field 306/806 and cross-slot resource allocation strategy selection field 308/808 of the link quality measurement and multi-channel cross-slot allocation signaling are different from their own registers 600 ("No"), they proceed to step s1020; otherwise ("Yes"), they proceed to step s1022.

Step s1020: The sensor(s) 110 (210) and/or node(s) 115 (215) corrects the link quality measurement feedback field 310/810 of the multi-channel cross-slot allocation signaling for cross-slot resource allocation errors, which have been reported.

Step s1021: The sensor(s) 110 (210) and/or node(s) 115 (215) sends link quality measurement and multi-channel cross-slot allocation signaling to video source apparatus 105, and proceeds to step s1013.

Step s1022: The sensor(s) 110 (210) and/or node(s) 115 (215) corrects the link quality measurement feedback field 310/810 of the multi-channel cross-slot allocation signaling, ensuring that the cross-slot resource allocation is correct and has been fed back.

Step s1023: Sensor(s) 110 (210) and/or node(s) 115 (215) send link quality measurement and multi-channel cross-slot allocation signaling to video source apparatus 105.

Step s1024: Video source apparatus 105 receives link quality measurements and multi-channel cross-slot allocation signaling from all sensor(s) 110 (210) and/or node(s) 115 (215) on all link topologies on all channels.

Step s1025: Initialize the link quality measurement of multi-channel cross-slot resource allocation frame structure 800 for video source apparatus 105, enable the time slot 802, and use multi-channel cross-slot resource allocation frame structure 800 to enable it.

Step s1026: Video source apparatus 105 initializes the resource interval link quality measurement header time slot 804 of multi-channel cross-slot resource allocation frame structure 800, and determines the specific link quality measurement sequence corresponding to the header based on the link quality measurement and the resource interval link quality measurement header field of the multi-channel cross-slot allocation signaling.

Step s1027: Video source apparatus 105 initializes multi-channel cross-slot resource allocation frame structure 800, and corrects the slot resource allocation list and slot 806 according to the link quality measurement and the slot resource allocation list field 306/806 of the multi-channel cross-slot allocation signaling.

Step s1028: Video source apparatus 105 initializes a new multi-channel cross-slot resource allocation frame structure 800, selects time slots for cross-slot resource allocation strategies, and prepares cross-slot resource scheduling and allocation methods, as well as video data transmission methods, according to the link quality measurement and cross-slot resource allocation strategy selection fields of multi-channel cross-slot allocation signaling.

Step s1029: Video source apparatus 105 initializes the link quality measurement feedback time slot 810 of multi-channel cross-slot resource allocation frame structure 800, and the video data for cross-slot resource allocation has been prepared for confirmation.

Step s1030: Video source apparatus 105 uses a new multi-channel cross-slot resource allocation frame structure 800 to send video data to all sensor(s) 110 (210) and/or node(s) 115 (215) on all link topologies on all channels.

Step s1031: All sensor(s) 110 (210) and/or node(s) 115 (215) on all link topologies on all channels receive video data sent by multi-channel cross-slot resource allocation frame structure 800. If the video data is not received correctly ("No"), they proceed to step s1032; otherwise, they proceed to step s1035.

Step s1032: The sensor(s) 110 (210) and/or node(s) 115 (215) corrects the link quality measurement feedback time slot 810 of multi-channel cross-slot resource allocation frame structure 800, and allocates video data reception errors for cross-slot resources, to be confirmed.

Step s1033: The sensor(s) 110 (210) and/or node(s) 115 (215) corrects the link quality measurement feedback field 310 of the multi-channel cross-slot allocation signaling and allocates video data for cross-slot resource allocation errors, to be confirmed.

Step s1034: The sensor(s) 110 (210) and/or node(s) 115 (215) sends link quality measurement and multi-channel cross-slot allocation signaling to video source apparatus 105, and proceeds to step s1013.

Step s1035: The sensor(s) 110 (210) and/or node(s) 115 (215) corrects the link quality measurement feedback time slot 810 of multi-channel cross-slot resource allocation frame structure 800, and receives the video data correctly for cross-slot resource allocation, to be confirmed.

Step s1036: The sensor(s) 110 (210) and/or node(s) 115 (215) corrects the link quality measurement feedback field 310 of the multi-channel cross-slot allocation signaling, and allocates video data correctly for cross-slot resource allocation, to be confirmed.

Step s1037: The sensor(s) 110 (210) and/or node(s) 115 (215) sends link quality measurement and multi-channel cross-slot allocation signaling to video source apparatus 105.

Step s1038: Video source apparatus 105 receives link quality measurements and multi-channel cross-slot allocation signaling from all nodes on all link topologies on all channels and/or video terminals.

Step s1039: Adjust video source apparatus 105 and cancel the link quality measurement of multi-channel cross-slot resource allocation frame structure 800 to enable the time slot.

Step s1040: Adjust and cancel the resource interval link quality measurement header time slot 804 of multi-channel cross-slot resource allocation frame structure 800 for video source apparatus 105.

Step s1041: Modify video source apparatus 105 and cancel multi-channel cross-slot resource allocation frame structure 800. Select the time slot for the cross-slot resource allocation strategy.

Step s1042: Adjust video source apparatus 105 and cancel the link quality measurement feedback time slot 810 of multi-channel cross-slot resource allocation frame structure 800.

Step s1043: Video source apparatus 105 uses a new modified multi-channel cross-slot resource allocation frame structure 800 to send video data to all sensor(s) 110 (210) and/or node(s) 115 (215) on all link topologies on all channels.

Step s1044: All sensor(s) 110 (210) and/or node(s) 115 (215) on all link topologies on all channels allocate registers 600 based on their own multi-channel time slot resources, including: cross-slot allocation bytes 602, channel allocation bytes 604, link topology level allocation bytes 606, channel specified by application purpose allocation bytes 608, link topology level and application purpose to obtain video data on multi-channel cross-slot resource allocation time slot resources, and complete display.

Step s1045: Complete the multi-channel cross-slot resource allocation process 1000 for video source apparatus 105, all sensor(s) 110 (210) and/or node(s) 115 (215) on all link topologies on all channels.

FIG. 11 shows an example video source apparatus 105 that can be used to implement the techniques described herein. Video source apparatus 105 is intended to represent various forms of digital computers, such as laptops, desktops, workstations, personal digital assistants, servers, blade servers, mainframes, and other appropriate computers. The components shown in FIG. 11, including connections and relationships, and their functions, are meant to be exemplary only, and are not meant to limit implementations of the inventions described and/or claimed in this document.

The video source apparatus 105 can include a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the video source apparatus 105, including instructions stored in the memory 1104 or on the storage device 1106 to display graphical information for a GUI on an external input/output device, such as one or more displays 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system). Accordingly, one or more displays 1116 can embody respective one or more sensor(s) 110 (210) and/or node(s) 115 (215) and high-speed interface 1108 can be used for the above-described communications between video source apparatus 105 and sensor(s) 110 (210) and/or node(s) 115 (215), for example, via channels 00-11.

The memory 1104 stores information within the video source apparatus 105. In some implementations, the memory 1104 is a volatile memory unit or units. In some implementations, the memory 1104 is a non-volatile memory unit or units. The memory 1104 can also be another form of computer-readable medium, such as a magnetic or optical disk. In one or more example implementations, display(s) 1116 incorporated as sensor(s) 110 (210) and/or node(s) 115 (215) includes at least one processor device (not shown) and/or memory device (not shown) for maintaining register 600 and performing corresponding processes described above. In certain embodiments, the at least one processor device of display(s) 1116 can conform to processor 1102 and the at least one memory device of display(s) 1116 can conform to memory 1104.

The storage device 1106 is capable of providing mass storage for the video source apparatus 105. In some implementations, the storage device 1106 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 can be configured to manage bandwidth-intensive operations, while the low-speed interface 1112 can be configured to manage lower bandwidth-intensive operations. Of course, one of ordinary skill in the art will recognize that such allocation of functions is exemplary only. In some implementations, the high-speed interface 1108 is coupled to the memory 1104, the display(s) 1116 (e.g., through a graphics processor or accelerator), and to the high-speed expansion ports 1110, which can accept various expansion cards (not shown). In an implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. One or more cameras, video sensors, image processors, imaging devices, optical probes, endoscopes, microscopes, or the like, can be coupled to high-speed interface 1108 or low-speed interface 1112 as an integrated or peripheral element for capturing video content. Correspondingly, sensor(s) 110 (210) and/or node(s) 115 (215) can be coupled to high-speed interface 1108 or low-speed interface 1112 for the video content transport communications described above, for example, via channels 00-11.

As noted herein, video source apparatus 105 can be implemented in a number of different forms, such as a standard server, or multiple times in a group of such servers. It can also be implemented as part of a rack server system. In addition, video source apparatus 105 can be implemented in a personal computer, such as a laptop computer. Alternatively, components from video source apparatus 105 can be combined with other components in a mobile device (not shown), such as a mobile computing device or the like.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-b). Description of elements with references to the base reference numerals (e.g., 210) also refer to all specific examples with such letter suffixes (e.g., 210-b), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A method, comprising:
    enabling, at a video source apparatus, link quality measurement for one or more communication links to corresponding one or more video display nodes;
    initializing, at the video source apparatus, one or more resource interval link quality measurement fields;
    transmitting, from the video source apparatus to the one or more video display nodes, link quality measurement and multi-channel cross-slot allocation signaling;
    receiving, at the video source apparatus, one or more link quality measurements for the respective one or more communication links;

selecting, at the video source apparatus, at least one multi-channel cross-slot allocation strategy for each of the one or more video display nodes based on the received one or more link quality measurements;
signaling the selected at least one multi-channel cross-slot allocation strategy to the one or more video display nodes using the one or more resource interval link quality measurement fields;
transmitting, from the video source apparatus to the one or more video display nodes via the respective one or more communication links, video data using a modified video data transmission frame structure communication protocol and based on the selected at least one multi-channel cross-slot allocation strategy; and
upon receiving confirmation of correct reception of the video data from the one or more video display nodes, cancelling, at the video source apparatus, the modified video data transmission frame structure communication protocol,
wherein the one or more resource interval link quality measurement fields each comprise a channel indicator, a link topology level indicator, and an application purpose indicator.

2. The method of claim 1, wherein the application purpose indicator indicates one or more of a video data transmission, a collaboration data transmission, a data retransmission, and a performance parameter change.

3. The method of claim 1, wherein the one or more resource interval link quality measurement fields each correspond to a slot resource allocation list field.

4. The method of claim 3, wherein each of the one or more video display nodes maintains a multi-channel slot resource allocation register for comparing with the slot resource allocation list field and the one or more resource interval link quality measurement fields.

5. The method of claim 3, further comprising:
when one of the one or more video display nodes determines a difference between the multi-channel slot resource allocation register and one or more of the slot resource allocation list field and the one or more resource interval link quality measurement fields, receiving, at the video apparatus from the one video display node, a link quality measurement feedback correction.

6. The method of claim 1, wherein
the modified video data transmission frame structure communication protocol comprises a revised video data transmission time slot,
the revised video data transmission time slot comprises a plurality of pixel data sub slots, and
each of the plurality of pixel data sub slots comprises one or more allocation time slots having a time slot allocation indicator, a channel allocation indicator, a link topology level allocation indicator, and application purpose allocation indicator for a corresponding one or more non-cross-slot resource.

7. The method of claim 1, wherein the link quality measurements comprise one or more of a channel throughput determination, a link topology level throughput determination, and an application purpose throughput determination.

8. The method of claim 1, wherein the at least one multi-channel cross-slot allocation strategy is selected from the group consisting of: a real-time display priority strategy, a synchronous display priority strategy, an image retention display priority strategy, a collaborative display optimization strategy, a retransmission display correction strategy, and a standard frame structure time slot resource allocation strategy.

9. A video source apparatus, comprising:
a communication interface to one or more video display nodes;
a processor operatively connected to the communication interface; and
a memory storage operatively connected to the processor and having stored thereon machine-readable instructions that cause the processor, when executed, to:
enable link quality measurement for one or more communication links to the one or more video display nodes;
initialize one or more resource interval link quality measurement fields;
transmit, to the one or more video display nodes, link quality measurement and multi-channel cross-slot allocation signaling;
receive one or more link quality measurements for the respective one or more communication links;
select at least one multi-channel cross-slot allocation strategy for each of the one or more video display nodes based on the received one or more link quality measurements;
signal the selected at least one multi-channel cross-slot allocation strategy to the one or more video display nodes using the one or more resource interval link quality measurement fields;
transmit, to the one or more video display nodes via the respective one or more communication links, video data using a modified video data transmission frame structure communication protocol and based on the selected at least one multi-channel cross-slot allocation strategy; and
upon receiving confirmation of correct reception of the video data from the one or more video display nodes, cancel the modified video data transmission frame structure communication protocol,
wherein the one or more resource interval link quality measurement fields each comprise a channel indicator, a link topology level indicator, and an application purpose indicator.

10. The video source apparatus of claim 9, wherein the application purpose indicator indicates one or more of a video data transmission, a collaboration data transmission, a data retransmission, and a performance parameter change.

11. The video source apparatus of claim 9, wherein the one or more resource interval link quality measurement fields each correspond to a slot resource allocation list field.

12. The video source apparatus of claim 11, wherein each of the one or more video display nodes maintains a multi-channel slot resource allocation register for comparing with the slot resource allocation list field and the one or more resource interval link quality measurement fields.

13. The video source apparatus of claim 12, wherein the machine-readable instructions, when executed, further cause the processor to:
when one of the one or more video display nodes determines a difference between the multi-channel slot resource allocation register and one or more of the slot resource allocation list field and the one or more resource interval link quality measurement fields, receive, from the one video display node, a link quality measurement feedback correction.

14. The video source apparatus of claim 9, wherein
the modified video data transmission frame structure communication protocol comprises a revised video data transmission time slot,
the revised video data transmission time slot comprises a plurality of pixel data sub slots, and
each of the plurality pixel data sub slots comprises one or more allocation time slots having a time slot allocation indicator, a channel allocation indicator, a link topology level allocation indicator, and application purpose allocation indicator for a corresponding one or more non-cross-slot resource.

15. The video source apparatus of claim 9, wherein the link quality measurements comprise one or more of a channel throughput determination, a link topology level throughput determination, and an application purpose throughput determination.

16. The video source apparatus of claim 9, wherein the at least one multi-channel cross-slot allocation strategy is selected from the group consisting of: a real-time display priority strategy, a synchronous display priority strategy, an image retention display priority strategy, a collaborative display optimization strategy, a retransmission display correction strategy, and a standard frame structure time slot resource allocation strategy.

17. A system, comprising:
one or more video display nodes;
a video source apparatus communicatively coupled to the one or more video display nodes via respective one or more communication links, said video source apparatus comprising:
  a processor; and
  a memory storage operatively connected to the processor and having stored thereon machine-readable instructions that cause the processor, when executed, to:
    enable link quality measurement for the one or more communication links to the one or more video display nodes;
    initialize one or more resource interval link quality measurement fields;
    transmit, to the one or more video display nodes, link quality measurement and multi-channel cross-slot allocation signaling;
    receive one or more link quality measurements for the respective one or more communication links;
    select at least one multi-channel cross-slot allocation strategy for each of the one or more video display nodes based on the received one or more link quality measurements;
    signal the selected at least one multi-channel cross-slot allocation strategy to the one or more video display nodes using the one or more resource interval link quality measurement fields;
    transmit, to the one or more video display nodes via the respective one or more communication links, video data using a modified video data transmission frame structure communication protocol and based on the selected at least one multi-channel cross-slot allocation strategy; and
    upon receiving confirmation of correct reception of the video data from the one or more video display nodes, cancel the modified video data transmission frame structure communication protocol,
wherein the one or more resource interval link quality measurement fields each correspond to a slot resource allocation list field,
each of the one or more video display nodes maintains a multi-channel slot resource allocation register for comparing with the slot resource allocation list field and the one or more resource interval link quality measurement fields, and
at least one of the one or more video display nodes transmits a link quality measurement feedback correction to the video source apparatus when the at least one video display node determines a difference between the multi-channel slot resource allocation register and one or more of the slot resource allocation list field and the one or more resource interval link quality measurement fields.

* * * * *